US012792184B2

(12) United States Patent
Chen et al.

(10) Patent No.: US 12,792,184 B2
(45) Date of Patent: Nov. 10, 2026

(54) DETECTION METHOD USING SIDE-FACING PIEZOELECTRIC VIRTUAL BUTTONS AND MODEL-BASED IDENTIFICATION OF FALSE TRIGGERS

(71) Applicant: UltraSense Systems, Inc., San Jose, CA (US)

(72) Inventors: Michael Chen, Sunnyvale, CA (US); Zhongxuan Tu, Shanghai (CN); Sina Akhbari, San Jose, CA (US); Hao-Yen Tang, San Jose, CA (US)

(73) Assignee: Ultra Sense Systems, Inc., San Jose, CA (US)

( * ) Notice: Subject to any disclaimer, the term of this patent is extended or adjusted under 35 U.S.C. 154(b) by 0 days.

(21) Appl. No.: 19/090,914

(22) Filed: Mar. 26, 2025

(65) Prior Publication Data

US 2025/0224841 A1 Jul. 10, 2025

Related U.S. Application Data

(63) Continuation of application No. 18/497,759, filed on Oct. 30, 2023, now Pat. No. 12,277,292, which is a (Continued)

(51) Int. Cl.
*G06F 3/043* (2006.01)
*G06F 3/041* (2006.01)

(52) U.S. Cl.
CPC .......... *G06F 3/04186* (2019.05); *G06F 3/043* (2013.01); *G06F 2203/04105* (2013.01)

(58) Field of Classification Search
CPC ................ G06F 3/04186; G06F 3/043; G06F 2203/04105
See application file for complete search history.

(56) References Cited

U.S. PATENT DOCUMENTS

2002/0163509 A1* 11/2002 Roberts .............. G06F 3/04142 345/173
2011/0260984 A1* 10/2011 Paleczny .............. G06F 1/1643 345/173

(Continued)

*Primary Examiner* — Afroza Chowdhury
(74) *Attorney, Agent, or Firm* — DORSEY & WHITNEY LLP; Alberto Araiza; Anni Siitonen

(57) ABSTRACT

A multi-virtual button finger-touch input system includes a cover layer, force-measuring and touch-sensing integrated circuits (FMTSICs), each coupled to the inner surface of the cover layer corresponding to one of the virtual buttons, an elongate flexible circuit, and a host controller. The FMTSICs are mounted to the elongate flexible circuit. The host controller is in communication with each of the FMTSICs via digital bus wiring. The host controller is configured to: (1) obtain force-localization features and ultrasound-localization features of the FMTSICs and (2) determine whether an event is a finger-touch event or a false-trigger event and if the event is determined to be finger-touch event, identify one of the virtual buttons as a touched virtual button, using at least in part a model that has the force-localization features and the ultrasound-localization features as inputs. The force-localization features and ultrasound-localization features are derived from the PMFE digital data and the PMUT digital data respectively.

15 Claims, 27 Drawing Sheets

Related U.S. Application Data continuation of application No. 17/521,606, filed on Nov. 8, 2021, now Pat. No. 11,803,274.

(60) Provisional application No. 63/111,314, filed on Nov. 9, 2020.

(56) References Cited

U.S. PATENT DOCUMENTS

| | | | | |
|---|---|---|---|---|
| 2015/0084873 | A1* | 3/2015 | Hagenbuch | G06F 3/0416 345/173 |
| 2015/0331517 | A1* | 11/2015 | Filiz | G06F 3/044 345/173 |
| 2017/0371454 | A1* | 12/2017 | Kitada | G06F 3/04186 |

* cited by examiner

DETECTION METHOD USING SIDE-FACING PIEZOELECTRIC VIRTUAL BUTTONS AND MODEL-BASED IDENTIFICATION OF FALSE TRIGGERS

CROSS-REFERENCE TO RELATED APPLICATIONS

This application is a continuation of U.S. patent application Ser. No. 18/497,759 filed on Oct. 30, 2023, entitled MULTI-VIRTUAL BUTTON FINGER-TOUCH INPUT SYSTEMS AND METHODS OF DETECTING A FINGER-TOUCH EVENT AT ONE OF A PLURALITY OF VIRTUAL BUTTONS, which is a continuation of U.S. patent application Ser. No. 17/521,606 (now U.S. Pat. No. 11,803,274) filed on Nov. 8, 2021, entitled MULTI-VIRTUAL BUTTON FINGER-TOUCH INPUT SYSTEMS AND METHODS OF DETECTING A FINGER-TOUCH EVENT AT ONE OF A PLURALITY OF VIRTUAL BUTTONS, which claims the benefit of U.S. Provisional Patent Application No. 63/111,314 filed on Nov. 9, 2020, entitled MULTI-VIRTUAL BUTTON FINGER-TOUCH INPUT SYSTEMS AND METHODS OF DETECTING A FINGER-TOUCH EVENT AT ONE OF A PLURALITY OF VIRTUAL BUTTONS, which are all incorporated herein by reference in their entireties.

BACKGROUND

Recent progress in integration of micro-electro-mechanical systems (MEMS) fabrication technologies with complementary metal-oxide-semiconductor (CMOS) semiconductor processing have enabled the fabrication of integrated circuits (ICs) containing piezoelectric micromechanical ultrasonic transducers (PMUTs) and piezoelectric micromechanical force-measuring elements (PMFEs). The resulting IC can be configured to have touch-sensing and force-measuring capabilities. Such ICs can be called force-measuring and touch-sensing integrated circuits (FMTSICs). It would be desirable to enable multi-virtual button finger-touch input systems employing these FMTSICs. It would also be desirable to enable methods of detecting a finger-touch event at one of a plurality of virtual buttons. One important challenge in developing such systems and methods is that of distinguishing false-trigger events from finger-touch events.

SUMMARY OF THE INVENTION

In one aspect, a multi-virtual button finger-touch input system includes a cover layer having an outer surface which can be touched by a finger and an inner surface opposite the outer surface, a plurality of force-measuring and touch-sensing integrated circuits (FMTSICs), an elongate flexible circuit, and a host controller. Each of the FMTSICs is coupled to the inner surface at a respective position and each of the FMTSICs corresponds to one of a plurality of virtual buttons. Each of the virtual buttons corresponds to a respective region of the cover layer. The elongate flexible circuit includes digital bus wiring. The FMTSICs are mounted to the elongate flexible circuit and are coupled to the digital bus wiring. The host controller is in communication with the FMTSICs via the digital bus wiring. Each FMTSIC includes: a semiconductor substrate, signal processing circuitry on the semiconductor substrate, at least one or two piezoelectric micromechanical force-measuring element(s) (PMFE(s)), at least one piezoelectric micromechanical ultrasonic transducer (PMUT) configured as a transmitter (PMUT transmitter), and at least one PMUT configured as a receiver (PMUT receiver). The PMUT transmitters of each of the FMTSICs are configured to transmit ultrasound signals towards the cover layer. The PMUT receivers of each of the FMTSICs are configured to output voltage signals (PMUT voltage signals) in response to reflected ultrasound signals arriving from the cover layer. The PMUT voltage signals are converted to PMUT digital data at the signal processing circuitry. The PMFEs of each of the FMTSICs are configured to output voltage signals (PMFE voltage signals) in accordance with a time-varying strain at each of the respective PMFEs resulting from a low-frequency mechanical deformation. The PMFE voltage signals are converted to PMFE digital data at the signal processing circuitry of the respective FMTSIC.

In another aspect, the host controller of the multi-virtual button finger-touch input system is configured to: (1) obtain force-localization features and ultrasound-localization features of the FMTSICs and (2) determine whether an event is a finger-touch event or a false-trigger event and if the event is determined to be finger-touch event, identify one of the virtual buttons as a touched virtual button, using at least in part a model that has the force-localization features and the ultrasound-localization features as inputs. The force-localization features of the FMTSICs are derived from the PMFE digital data of the FMTSICs and the ultrasound-localization features of the FMTSICs are derived from the PMUT digital data of the FMTSICs.

In yet another aspect, the host controller of the multi-virtual button finger-touch input system is configured to: (1) obtain force-localization features, force-resolution features, and ultrasound-localization features of the FMTSICs and (2) determine whether an event is a finger-touch event or a false-trigger event and if the event is determined to be finger-touch event, identify one of the virtual buttons as a touched virtual button, using at least in part a model that has the force-localization features, the force-resolution features, and the ultrasound-localization features as inputs. The force-localization features and the force-resolution features of the FMTSICs are derived from the PMFE digital data of the FMTSICs and the ultrasound-localization features of the FMTSICs are derived from the PMUT digital data of the FMTSICs.

In yet another aspect, the host controller of the multi-virtual button finger-touch input system is configured to: (1) obtain force-localization features and ultrasound-localization features of the FMTSICs, (2) determine FMTSICs that satisfy first candidate conditions or second candidate conditions to identify candidate FMTSICs, (3) if there are no candidate FMTSICs, determine that an event is a false-trigger event, (4) if there is at least one candidate FMTSIC, determine whether the event is a finger-touch event or a false-trigger event and if the event is determined to be finger-touch event, identify one of the virtual buttons as a touched virtual button, using at least in part a model that has the force-localization features and the ultrasound-localization features as inputs. The force-localization features of the FMTSICs are derived from the PMFE digital data of the FMTSICs. The force-localization features include a sum of PMFE digital data of two or more of the PMFEs of each of the FMTSICs (force-sum data). The ultrasound-localization features of the FMTSICs are derived from the PMUT digital data of the FMTSICs. The ultrasound-localization features include "PMUT Triggered" Boolean data of each of the FMTSICs. The first candidate conditions of each of the FMTSICs include: the "PMUT Triggered" Boolean data of the respective FMTSIC is True and the force-sum data of the respective FMTSIC indicates an applied force greater than $F_1$. The second candidate conditions of each of the FMTSICs include: the "PMUT Triggered" Boolean data of the respective FMTSIC is False and the force-sum data of the respective FMTSIC indicates an applied force greater than $F_2$, in which $F_2$ is greater than $F_1$.

In yet another aspect, a method of detecting a finger-touch event at one of a plurality of virtual buttons includes: (1) configuring a cover layer, (2) configuring a plurality of FMTSICs coupled to the inner surface of the cover layer at respective positions, (3) configuring a host controller in communication with each of the FMTSICs via the digital bus wiring, (4) transmitting, by the PMUT transmitters of each of the FMTSICs, ultrasound signals towards the cover layer, (5) outputting, from the PMUT receivers of each of the FMTSICs, voltage signals (PMUT voltage signals) in response to reflected ultrasound signals arriving from the cover layer, (6) converting, by the signal processing circuitry of each of the FMTSICs, the respective PMUT voltage signals to PMUT digital data, (7) outputting, from the PMFEs of each of the FMTSICs, voltage signals (PMFE voltage signals) in accordance with a time-varying strain at each of the respective PMFEs resulting from a low-frequency mechanical deformation, and (8) converting, by the signal processing circuitry of each of the FMTSICs, the respective PMFE voltage signals to PMFE digital data.

In yet another aspect, the method of detecting a finger-touch event at one of a plurality of virtual buttons includes: (A9) obtaining, by the host controller, force-localization features and ultrasound-localization features of the FMTSICs and (A10) determining, by the host controller, whether an event is a finger-touch event or a false-trigger event and if the event is determined to be finger-touch event, identifying one of the virtual buttons as a touched virtual button, using at least in part a model that has the force-localization features and the ultrasound-localization features as inputs. The force-localization features of the FMTSICs are derived from the PMFE digital data of the FMTSICs and the ultrasound-localization features of the FMTSICs are derived from the PMUT digital data of the FMTSICs.

In yet another aspect, the method of detecting a finger-touch event at one of a plurality of virtual buttons includes: (B9) obtaining, by the host controller, force-localization features, force-resolution features, and ultrasound-localization features of the FMTSICs and (B10) determining, by the host controller, whether an event is a finger-touch event or a false-trigger event and if the event is determined to be finger-touch event, identifying one of the virtual buttons as a touched virtual button, using at least in part a model that has the force-localization features, force-resolution features, and the ultrasound-localization features as inputs. The force-localization features and the force-resolution features of the FMTSICs are derived from the PMFE digital data of the FMTSICs and the ultrasound-localization features of the FMTSICs are derived from the PMUT digital data of the FMTSICs.

In yet another aspect, the method of detecting a finger-touch event at one of a plurality of virtual buttons includes: (C9) obtaining, by the host controller, force-localization features and ultrasound-localization features of the FMTSICs and (C10) determining, by the host controller IC, FMTSICs that satisfy first candidate conditions or second candidate conditions to identify candidate FMTSICs, (C11) if there are no candidate FMTSICs, determining, by the host controller IC, that an event is a false-trigger event, and (C12) if there are candidate FMTSICs, determining, by the host controller, whether an event is a finger-touch event or a false-trigger event and if the event is determined to be finger-touch event, identifying one of the virtual buttons as a touched virtual button, using at least in part a model that has the force-localization features and the ultrasound-localization features as inputs. The force-localization features of the FMTSICs are derived from the PMFE digital data of the FMTSICs. The force-localization features include a sum of PMFE digital data of two or more of the PMFEs of each of the FMTSICs (force-sum data). The ultrasound-localization features of the FMTSICs are derived from the PMUT digital data of the FMTSICs. The ultrasound-localization features include "PMUT Triggered" Boolean data of each of the FMTSICs. The first candidate conditions of each of the FMTSICs include: the "PMUT Triggered" Boolean data of the respective FMTSIC is True and the force-sum data of the respective FMTSIC indicates an applied force greater than $F_1$. The second candidate conditions of each of the FMTSICs include: the "PMUT Triggered" Boolean data of the respective FMTSIC is False and the force-sum data of the respective FMTSIC indicates an applied force greater than $F_2$, in which $F_2$ is greater than $F_1$.

The above summary of the present invention is not intended to describe each disclosed embodiment or every implementation of the present invention. The description that follows more particularly exemplifies illustrative embodiments. In several places throughout the application, guidance is provided through examples, which examples can be used in various combinations. In each instance of a list, the recited list serves only as a representative group and should not be interpreted as an exclusive list.

BRIEF DESCRIPTION OF THE FIGURES

The disclosure may be more completely understood in consideration of the following detailed description of various embodiments of the disclosure in connection with the accompanying drawings, in which.

DETAILED DESCRIPTION OF ILLUSTRATIVE EMBODIMENTS

The present disclosure relates to multi-virtual button finger-touch input systems and methods of detecting a finger-touch event at one of a plurality of virtual buttons.

In this disclosure:

The words "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

The terms "comprises" and variations thereof do not have a limiting meaning where these terms appear in the description and claims.

Unless otherwise specified, "a," "an," "the," and "at least one" are used interchangeably and mean one or more than one.

The recitations of numerical ranges by endpoints include all numbers subsumed within that range (e.g., 1 to 5 includes 1, 1.5, 2, 2.75, 3, 3.80, 4, 5, etc.).

For any method disclosed herein that includes discrete steps, the steps may be conducted in any feasible order. As appropriate, any combination of two or more steps may be conducted simultaneously.

Figure 1:
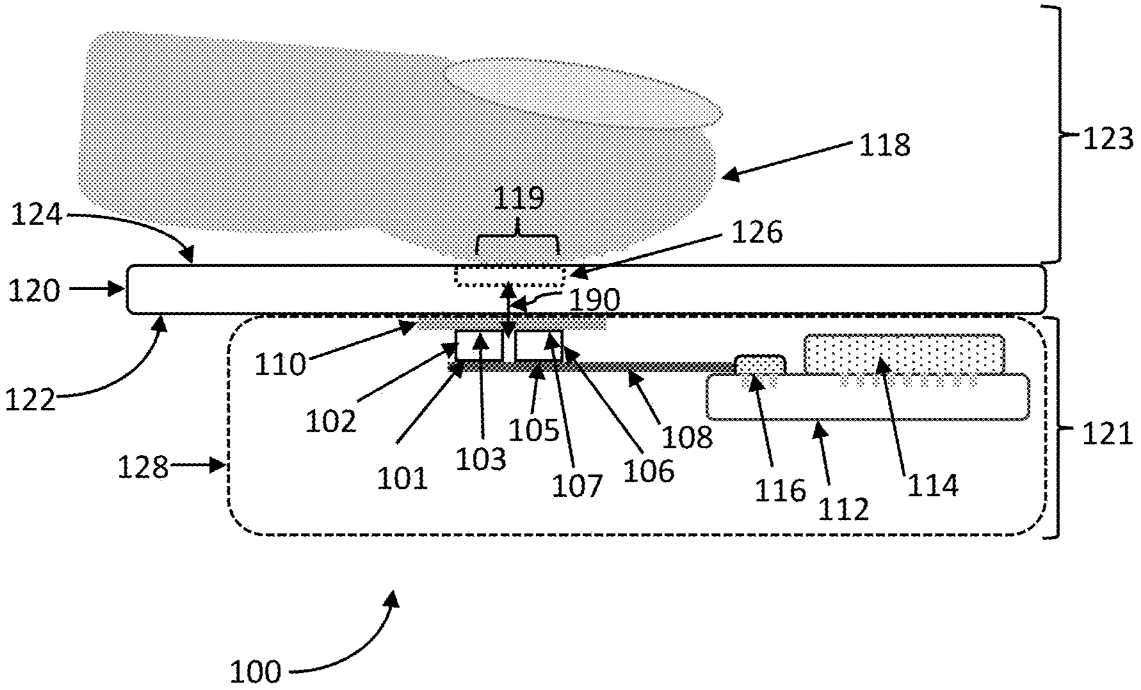
FIG. 1 is a schematic view of a system including two force-measuring and touch-sensing integrated circuits (FMTSICs).

FIG. 1 is a schematic view of an input system 100. In the example shown, system 100 includes force-measuring and touch-sensing integrated circuits (FMTSICs) 102, 106. Each of the FMTSICs 102, 106 has an electrical interconnection surface (bottom surface) 101, 105 and an ultrasound transmission surface (top surface) 103, 107. In the example shown, each FMTSIC 102, 106 is in the form of a semiconductor die in a package. The FMTSICs are mounted to a flexible circuit substrate (flexible circuit) 108 (e.g., an FPC or flexible printed circuit) on the electrical interconnection surfaces 101, 105. The flexible circuit 108 is electrically and mechanically connected to a printed circuit board (PCB) 112 via a connector 116. Other ICs 114 are mounted on the PCB 112, and such other ICs 114 could be a microcontroller (MCU), microprocessor (MPU), and/or a digital signal processor (DSP), for example. These other ICs 114 could be used to run programs and algorithms to analyze and categorize touch events based on data received from the FMTSICs 102, 106. Other ICs 114 can also be mounted to the flexible circuit.

System 100 includes a cover layer 120 having an exposed outer surface 124 and an inner surface 122. The cover layer 120 could be of any robust layer(s) that transmits ultrasound waves, such as wood, glass, metal, plastic, leather, fabric, and ceramic. The cover layer should be robust but should be sufficiently deformable, such that a deformation of the cover layer is transmitted to the PMFEs in the FMTSICs, as described in FIGS. 12, 13, and 14. The cover layer 120 could also be a composite stack and could be a composite stack of any of the foregoing materials. The FMTSICs 102, 106 are adhered to or attached to the inner surface 122 of the cover layer 120 by a layer of adhesive 110. The choice of adhesive 110 is not particularly limited as long as the FMTSIC remains attached to the cover layer. The adhesive 110 could be double-sided tape, pressure sensitive adhesive (PSA), epoxy adhesive, or acrylic adhesive, for example. FMTSICs 102, 106 are coupled to the inner surface 122. In operation, the FMTSICs 102, 106 generate ultrasound waves in longitudinal modes that propagate along a normal direction 190, shown in FIG. 1 as being approximately normal to the exposed outer surface 124 and the inner surface 122 of the cover layer. Stated more precisely, the normal direction 190 is normal to a piezoelectric layer. Since the piezoelectric layer defines a plane of a piezoelectric capacitor, the normal direction 190 is approximately normal to a plane of the piezoelectric capacitor. The generated ultrasound waves exit the FMTSICs 102, 106 and travel through the respective ultrasound transmission surfaces 103, 107, through the adhesive layer 110, then through the inner surface 122, and then through the cover layer 120. The ultrasound waves reach a sense region 126 of the exposed outer surface 124. The sense region 126 is a region of the exposed outer surface 124 that overlaps the FMTSICs 102, 106.

FIG. 1 illustrates a use case in which a human finger 118 is touching the cover layer at the sense region 126. If there is no object touching the sense region 126, the ultrasound waves that have propagated through the cover layer 120 are reflected at the exposed outer surface (at the air-material interface) and the remaining echo ultrasound waves travel back toward the FMTSICs 102, 106. On the other hand, if there is a finger 118 touching the sense region, there is relatively large attenuation of the ultrasound waves by absorption through the finger. As a result, it is possible to detect a touch event by measuring the relative intensity or energy of the echo ultrasound waves that reach the FMTSICs 102, 106.

It is possible to distinguish between a finger touching the sense region 126 and a water droplet landing on the sense region 126, for example. When a finger touches the sense region 126, the finger would also exert a force on the cover layer 120. The force exerted by the finger on the cover layer can be detected and measured using the PMFEs in the FMTSIC. On the other hand, when a water droplet lands on the sense region, the force exerted by the water droplet on the PMFEs would be quite small, and likely less than a noise threshold. More generally, it is possible to distinguish between a digit that touches and presses the sense region 126 and an inanimate object that comes into contact with the sense region 126. In both cases (finger touching the sense region or water droplet landing on the sense region), there would be a noticeable decrease in an amplitude of the PMUT receiver signal, indicating a touch at the sense region, but there might not be enough information from the PMUT receiver signal to distinguish between a finger and a water droplet.

FIG. 1 shows a finger-touch zone 119, which is a zone of contact between the finger 118 and the cover layer 120. Finger-touch zone 119 has a size (a lateral dimension) that depends on factors such as size of the finger 118 and whether the finger is a bare finger or a glove-covered finger. Typically, a finger-touch zone 119 can have a size in a range of 3 mm to 7 mm. In the example shown, FMTSICs 102 and 106 are separated from each other by a distance smaller than the finger-touch zone 119. Accordingly, FMTSICs 102 and 106 can correspond to a single virtual button. A touch-input system can have multiple virtual buttons, and the virtual buttons can be separated from each other by a distance greater than a finger-touch zone.

System 100 can be implemented in numerous apparatuses. For example, the FMTSICs can replace conventional buttons on Smartphones, keys on computer keyboards, sliders, or track pads. The interior contents 128 of an apparatus (e.g., FMTSICs 102, 106, flexible circuit 108, connector 116, PCB 112, other ICs 114) can be sealed off from the exterior 123 of the cover layer 120, so that liquids on the exterior 123 cannot penetrate into the interior 121 of the apparatus. The ability to seal the interior of an apparatus from the outside helps to make the apparatus, such as a Smartphone or laptop computer, waterproof. There are some applications, such as medical applications, where waterproof buttons and keyboards are strongly desired. The apparatus can be a mobile appliance (e.g., Smartphone, tablet computer, laptop computer), a household appliance (e.g., washing machine, dryer, light switches, air conditioner, refrigerator, oven, remote controller devices), a medical appliance, an industrial appliance, an office appliance, an automobile, or an airplane, for example.

Figure 2:
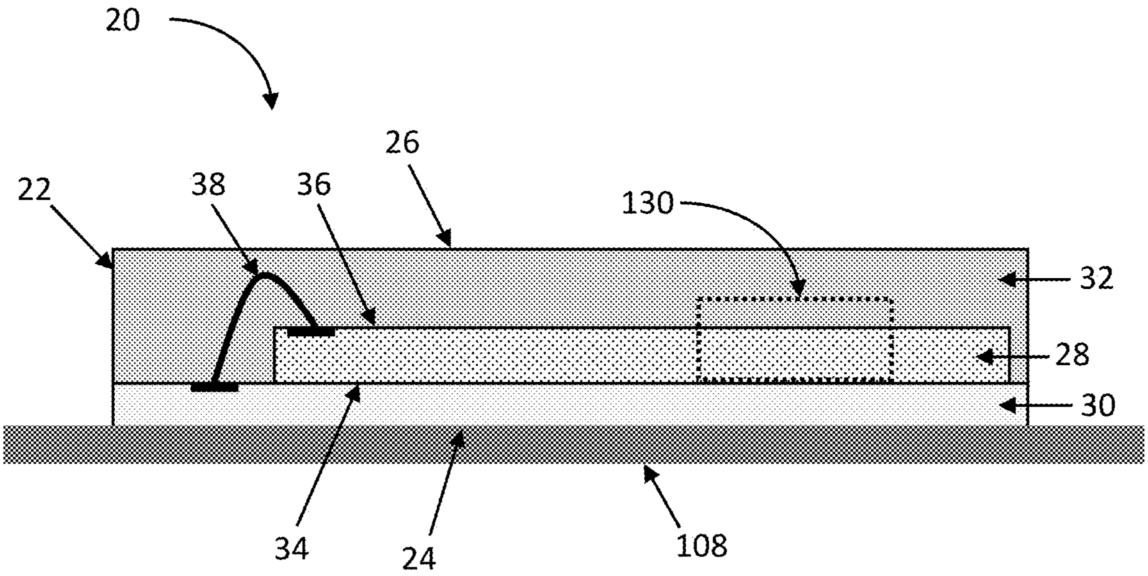
FIG. 2 is a schematic cross-sectional view of a force-measuring and touch-sensing integrated circuit.

The force-measuring, touch-sensing integrated circuit (FMTSIC) is shown in greater detail in FIG. 2. FIG. 2 is a cross-sectional view the FMTSIC 20, which is analogous to FMTSIC 102, 106 in FIG. 1. FMTSIC 20 is shown encased in a package 22, with an ultrasound transmission surface (top surface) 26 and electrical interconnection surface (bottom surface) 24. Ultrasound transmission surface 26 is analogous to surfaces 103, 107 in FIG. 1 and electrical interconnection surface 24 is analogous to surfaces 101, 105 in FIG. 1. The FMTSIC 20 includes a package substrate 30, semiconductor portion (chip) 28 mounted to the package substrate 30, and an encapsulating adhesive 32, such as an epoxy adhesive. After the semiconductor die 28 is mounted to the package substrate 30, wire bond connections 38 are formed between the die 28 and the package substrate 30. Then the entire assembly including the die 28 and the package substrate 30 are molded (encapsulated) in an epoxy adhesive 32. The epoxy side (top surface or ultrasound transmission surface 26) of the FMTSIC is adhered to (coupled to) the inner surface 122 of the cover layer 120. The FMTSIC 20 is shown mounted to the flexible circuit 108. It is preferable that the FMTSIC have lateral dimensions no greater than 10 mm by 10 mm. The wire bond connection is formed between the top surface 36 of the semiconductor die 28 and the package substrate 30. Alternatively, electrical interconnections can be formed between the bottom surface 34 of the semiconductor die 28 and the package substrate. The semiconductor die 28 consists of an application-specific integrated circuit (ASIC) portion and a micro-electro-mechanical systems (MEMS) portion. A selected portion 130 of the semiconductor die 28 is shown in cross-section in FIG. 3.

Figure 3:
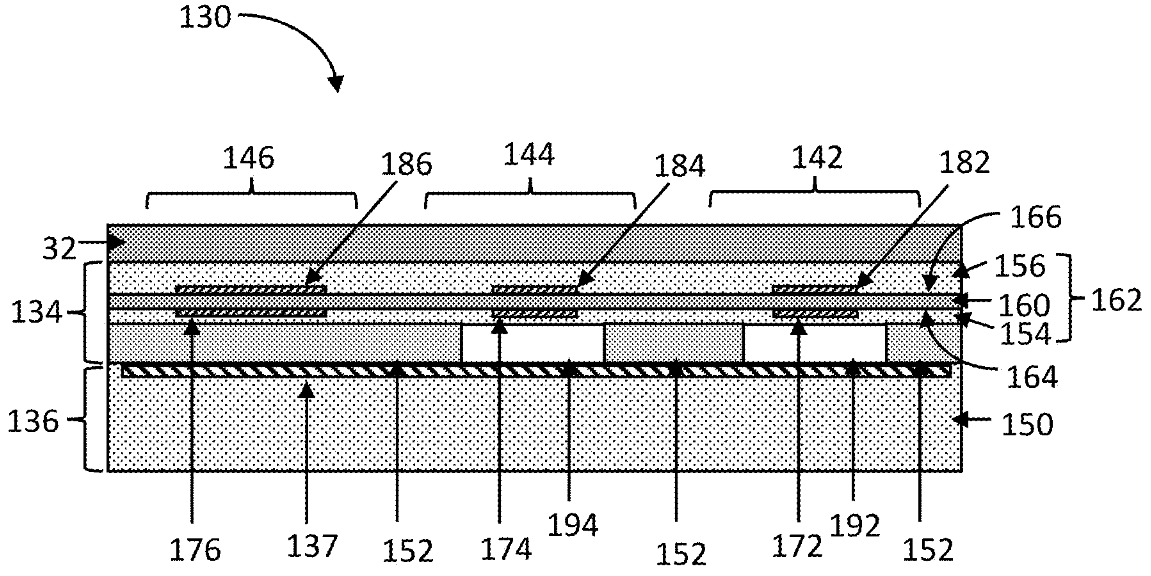
FIG. 3 is a schematic cross-sectional view of a certain portion of the force-measuring and touch-sensing integrated circuit of FIG. 2.

FIG. 3 is a schematic cross-sectional view of a portion 130 of the force-measuring and touch-sensing integrated circuit of FIG. 2. The semiconductor die 28 includes a MEMS portion 134 and an ASIC portion 136. Between the ASIC portion 136 and the MEMS portion 134, the MEMS portion 134 is closer to the ultrasound transmission surface 26 and the ASIC portion 136 is closer to the electrical interconnection surface 24. The ASIC portion 136 consists of a semiconductor substrate 150 and signal processing circuitry 137 thereon. Typically, the semiconductor substrate is a silicon substrate, but other semiconductor substrates such as silicon-on-insulator (SOI) substrates can also be used.

The MEMS portion 134 includes a PMUT transmitter 142, a PMUT receiver 144, and a PMFE 146. The MEMS portion 134 includes a thin-film piezoelectric stack 162 overlying the semiconductor substrate 150. The thin-film piezoelectric stack 162 includes a piezoelectric layer 160, which is a layer exhibiting the piezoelectric effect. Suitable materials for the piezoelectric layer 160 are aluminum nitride, scandium-doped aluminum nitride, polyvinylidene fluoride (PVDF), lead zirconate titanate (PZT), $K_xNa_{1-x}NbO_3$ (KNN), quartz, zinc oxide, and lithium niobate, for example. For example, the piezoelectric layer is a layer of aluminum nitride having a thickness of approximately 1 μm. The piezoelectric layer 160 has a top major surface 166 and a bottom major surface 164 opposite the top major surface 166. In the example shown, the thin-film piezoelectric stack 162 additionally includes a top mechanical layer 156, attached to or adjacent to (coupled to) top major surface 166, and a bottom mechanical layer 154, attached to or adjacent to (coupled to) bottom major surface 164. In the example shown, the thickness of the top mechanical layer 156 is greater than the thickness of the bottom mechanical layer 154. In other examples, the thickness of the top mechanical layer 156 can be smaller than the thickness of the bottom mechanical layer 154. Suitable materials for the mechanical layer(s) are silicon, silicon oxide, silicon nitride, and aluminum nitride, for example. Suitable materials for the mechanical layer(s) can also be a material that is included in the piezoelectric layer 160, which in this case is aluminum nitride. In the example shown, the top mechanical layer and the bottom mechanical layer contain the same material. In other examples, the top mechanical layer and the bottom mechanical layer are of different materials. In other examples, one of the top mechanical layer and the bottom mechanical layer can be omitted. When coupled to the cover layer, the FMTSIC 20 is preferably oriented such that the piezoelectric layer 160 faces toward the cover layer 120. For example, the FMTSIC 20 is oriented such that the piezoelectric layer 160 and the cover layer 120 are approximately parallel.

For case of discussion, only one of each of the PMUT transmitters, PMUT receivers, and PMFEs is shown in FIG. 3. However, a typical FMTSIC can contain a plurality of PMUT transmitters, PMUT receivers, and PMFEs. The PMUT transmitters, the PMUT receivers, and the PMFEs are located along respective lateral positions along the thin-film piezoelectric stack 162. Each PMUT transmitter, PMUT receiver, and PMFE includes a respective portion of the thin-film piezoelectric stack.

Each of the PMUTs is configured as a transmitter (142) or a receiver (144). Each PMUT (142, 144) includes a cavity (192, 194) and a respective portion of the thin-film piezoelectric stack 162 overlying the cavity (192, 194). The cavities are laterally bounded by an anchor layer 152 which supports the thin-film piezoelectric stack. Suitable materials for the anchor layer 152 are silicon, silicon nitride, and silicon oxide, for example. Suitable materials for the anchor layer 152 can also be a material that is included in the piezoelectric layer 160, which in this case is aluminum nitride. Each PMUT (142, 144) includes a first PMUT electrode (172, 174) positioned on a first side (bottom surface) 164 of the piezoelectric layer 160 and a second PMUT electrode (182, 184) positioned on a second side (top surface) 166 opposite the first side. In each PMUT (142, 144), the first PMUT electrode (172, 174), the second PMUT electrode (182, 184), and the piezoelectric layer 160 between them constitute a piezoelectric capacitor. The first PMUT electrodes (172, 174) and the second PMUT electrodes (182, 184) are coupled to the signal processing circuitry 137. The cavities (172, 174) are positioned between the thin-film piezoelectric stack 162 and the semiconductor substrate 150. In the example shown, the FMTSIC 20 is in the form of an encapsulated package 22. The cavities 192, 194 are preferably under low pressure (pressure lower than atmospheric pressure or in vacuum) and remain so because of the package 22.

Each PMFE 146 includes a respective portion of the thin-film piezoelectric stack 162. Each PMFE 146 includes a first PMFE electrode 176 positioned on a first side (bottom surface) 164 of the piezoelectric layer 160 and a second PMFE electrode 186 positioned on a second side (top surface) 166 opposite the first side. In each PMFE 146, the first PMFE electrode 176, the second PMFE electrode 186, and the piezoelectric layer 160 between them constitute a piezoelectric capacitor. The PMFEs are coupled to the signal processing circuitry 137. In the example shown, the PMFE is not overlying any cavity.

Figure 4:
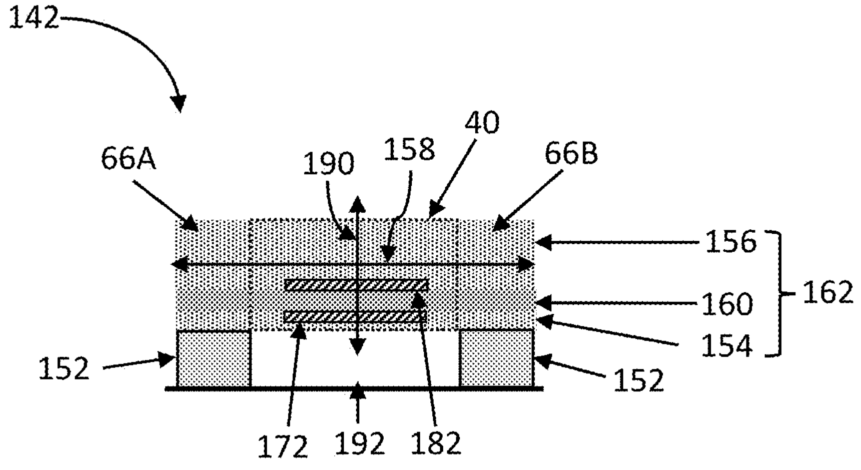
FIGS. 4, 5, and 6 are schematic cross-sectional views of a PMUT transmitter.
Figure 5:
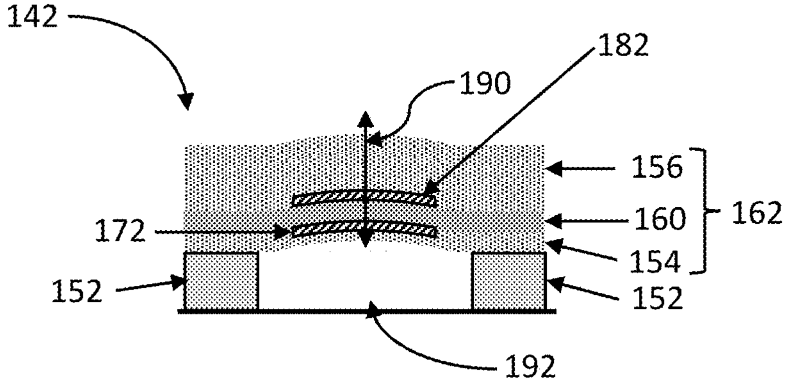

The PMUT transmitter 142 is shown in cross section in FIG. 4. In the example shown, the thickness of the top mechanical layer 156 is greater than the thickness of the bottom mechanical layer 154, and the top mechanical layer 156 and the bottom mechanical layer contain the same material, aluminum nitride. In this case, the neutral axis 158 is positioned within the top mechanical layer 156. The neutral axis is the axis in the beam (in this case, the beam is the piezoelectric stack 162) along which there are no normal stresses or strains during bending. FIG. 4 shows the PMUT transmitter in a quiescent state, in which there is no voltage applied between the first PMUT electrode 172 and the second PMUT electrode 182. The piezoelectric layer 160 has a built-in polarization (piezoelectric polarization) that is approximately parallel to normal direction 190. Normal direction 190 is normal to the piezoelectric layer 160. Normal direction 190 is approximately normal to a plane of the respective piezoelectric capacitor. FIG. 5 shows the PMUT transmitter in a first transmitter state, in which there is a first transmitter voltage $V_{Tx1}$ (corresponding to a certain polarity and magnitude) applied between the electrodes (172, 182). As a result, the portion of the piezoelectric stack 162 overlying the cavity 192 flexes upward (away from the cavity 192). In a middle region in between the inflection points of the piezoelectric stack, there is compressive (negative) strain in portions of the piezoelectric stack 162 below the neutral axis 158, including the piezoelectric layer 160, and tensile (positive) strain in portions of the piezoelectric stack 162 above the neutral axis 158.

Figure 6:
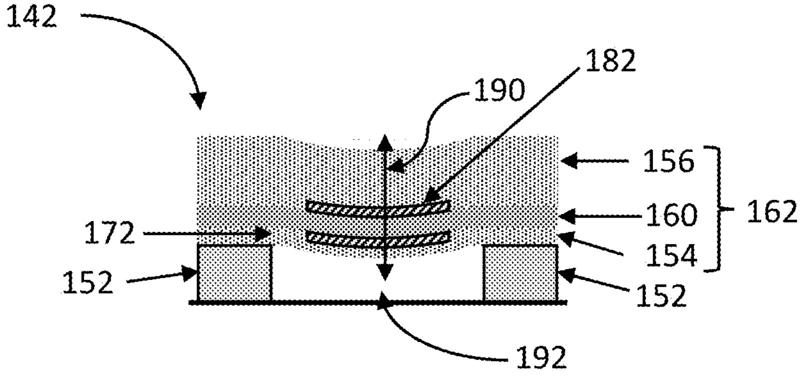

FIG. 6 shows the PMUT transmitter in a second transmitter state, in which there is a second transmitter voltage $V_{Tx2}$ (corresponding to a certain polarity and magnitude) applied between the PMUT electrodes (172, 182). In a middle region in between the inflection points of the piezoelectric stack, there is tensile (positive) strain in portions of the piezoelectric stack 162 below the neutral axis 158, including the piezoelectric layer 160, and compressive (negative) strain in portions of the piezoelectric stack 162 above the neutral axis 158. As a result, the portion of the piezoelectric stack 162 overlying the cavity 192 flexes downward (toward the cavity 192). The signal processing circuitry 137 is operated to generate and apply a time-varying voltage signal $V_{Tx}(t)$ between the PMUT electrodes (172, 182) of the PMUT transmitter 142. If the time-varying voltage signal oscillates between the first transmitter voltage and the second transmitter voltage at a certain frequency, the portion of the piezoelectric stack 162 oscillates between the first transmitter state and the second transmitter state at that frequency. As a result, the PMUT transmitter generates (transmits), upon application of the time-varying voltage signal, ultrasound signals propagating along the normal direction 190. Because of the presence of the cavity 192 at a low pressure, a relatively small fraction of the generated ultrasound energy is transmitted downward toward the cavity 192, and a relatively large fraction of the generated ultrasound energy is transmitted upward away from the cavity 192. The PMUT transmitters are configured to transmit ultrasound signals of a frequency in a range of 0.1 MHz to 25 MHZ.

Figure 7:
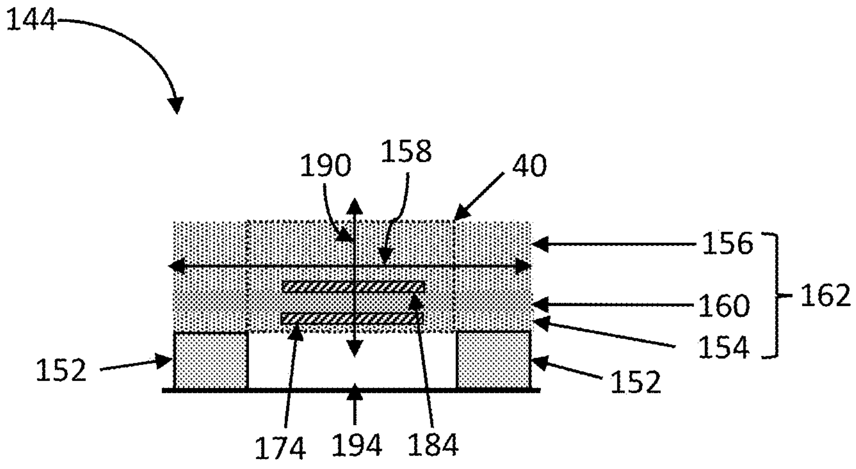
FIGS. 7, 8, and 9 are schematic cross-sectional views of a PMUT receiver.
Figure 8:
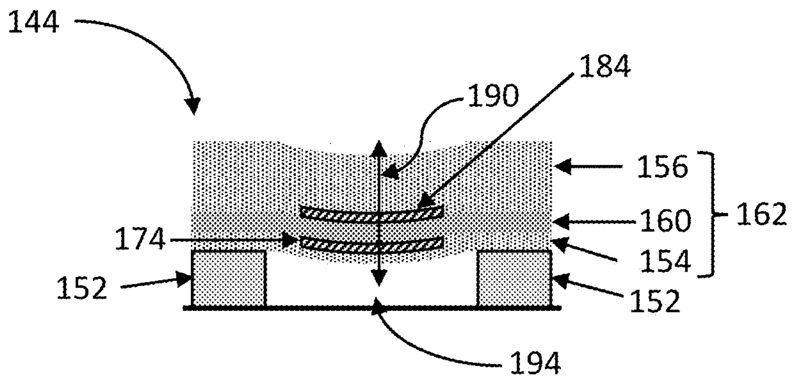

The PMUT receiver 144 is shown in cross section in FIG. 7. FIG. 7 shows the PMUT receiver in a quiescent state, in which there is no flexing of the piezoelectric stack 162 away from or towards the cavity 194. In the quiescent state, there is no voltage generated between the PMUT electrodes (174, 184). FIG. 8 shows the PMUT receiver in a first receiver state, in which a positive ultrasound pressure wave is incident on the PMUT receiver, along the normal direction 190, to cause the portion of the piezoelectric stack 162 overlying the cavity 194 to flex downwards (towards the cavity 194). In a middle region in between the inflection points of the piezoelectric stack, there is tensile (positive) strain in portions of the piezoelectric stack 162 below the neutral axis 158, including the piezoelectric layer 160, and compressive (negative) strain in portions of the piezoelectric stack 162 above the neutral axis 158. As a result, a first receiver voltage $V_{Rx1}$ (corresponding to a certain polarity and magnitude) is generated between the PMUT electrodes (174, 184).

Figure 9:
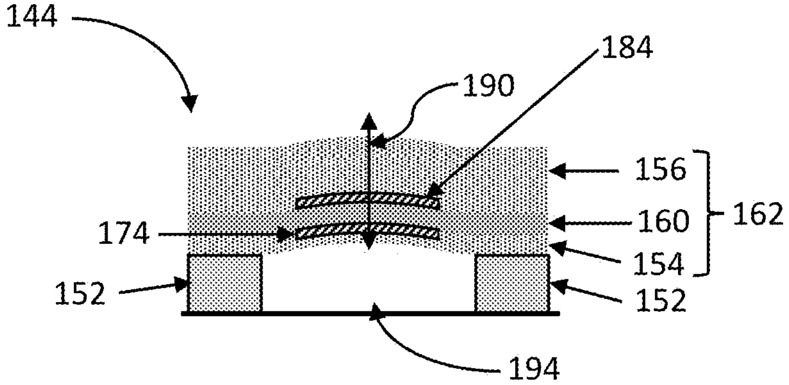

FIG. 9 shows the PMUT receiver in a second receiver state, in which a negative ultrasound pressure wave is incident on the PMUT receiver, along the normal direction 190, to cause the portion of the piezoelectric stack 162 overlying the cavity 194 to flex upwards (away from the cavity 194). In a middle region in between the inflection points of the piezoelectric stack, there is compressive (negative) strain in portions of the piezoelectric stack 162 below the neutral axis 158, including the piezoelectric layer 160, and tensile (positive) strain in portions of the piezoelectric stack 162 above the neutral axis 158. As a result, a second receiver voltage $V_{Rx2}$ (corresponding to a certain polarity and magnitude) is generated between the PMUT electrodes (174, 184). If ultrasound signals are incident on the PMUT receiver 144 along the normal direction 190 causing the portion of the piezoelectric stack 162 to oscillate between the first receiver state and the second receiver state, a time-varying voltage signal $V_{Rx}(t)$ oscillating between the first receiver voltage and the second receiver voltage is generated between the PMUT electrodes (174, 184). The time-varying voltage signal is amplified and processed by the signal processing circuitry 137.

In operation, the PMUT transmitter 142 is configured to transmit, upon application of voltage signals between the PMUT transmitter electrodes (172, 182), ultrasound signals of a first frequency $F_1$, in longitudinal mode(s) propagating along a normal direction 190 approximately normal to the piezoelectric layer 160 away from the cavity 192 towards the sense region 126. The ultrasound signals propagate towards the sense region 126 of the cover layer 120 to which FMTSIC 20 is coupled. Upon application of the voltage signals, the respective portion of the piezoelectric stack overlying the cavity 192 (of the PMUT transmitter 142) oscillates with a first frequency $F_1$ between a first transmitter state and a second transmitter state to generate ultrasound signals of the first frequency $F_1$. The PMUT receiver 144 is configured to output, in response to ultrasound signals of the first frequency $F_1$ arriving along the normal direction, voltage signals between the PMUT receiver electrodes (174, 184). In response to ultrasound signals of the first frequency $F_1$ arriving along the normal direction, the portion of the thin-film piezoelectric stack 162 overlying the cavity oscillates at the first frequency $F_1$. Some fraction of the ultrasound signals transmitted by the PMUT transmitter 142 returns to the PMUT receiver 144 as an echo ultrasound signal. In the use case illustrated in FIG. 1, the relative amplitude or energy of the echo ultrasound signal depends upon the presence of a digit (e.g., human finger) or other object (e.g., water droplet) touching the sense region 126. If the sense region 126 is touched by a digit or other object, there is greater attenuation of the echo ultrasound signal than if there is no touching at the sense region 126. By amplifying and processing the time-varying voltage signal from the PMUT receiver at the signal processing circuitry, these touch events can be detected.

Figure 10:
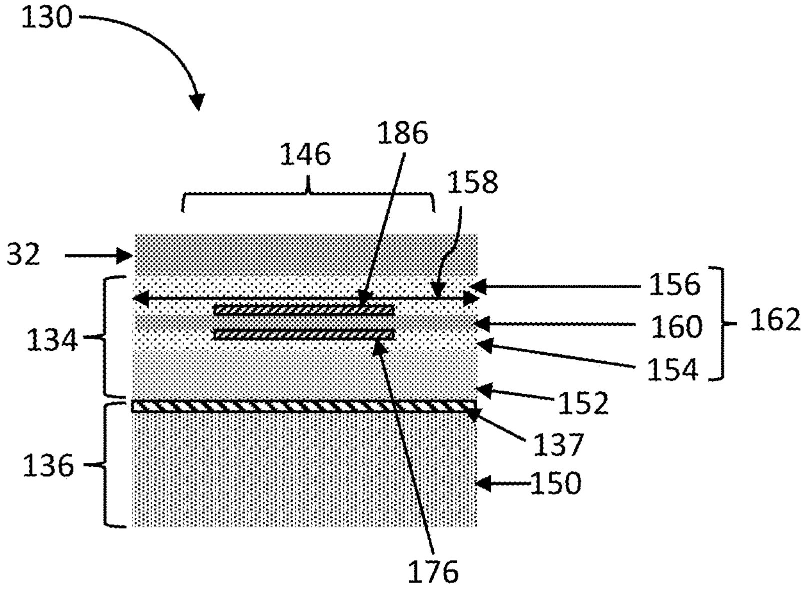
FIG. 10 is a schematic cross-sectional view of a piezoelectric micromechanical force-measuring element (PMFE).

A portion 130 of the FMTSIC 20 containing a PMFE 146 is shown in cross section in FIG. 10. Also shown is the ASIC portion 136 that is under the PMFE 146 and the encapsulating adhesive 32 that is above the PMFE 146. FIG. 10 shows the PMFE in a quiescent state, in which there is no flexing of the piezoelectric stack 162. In the quiescent state, there is no voltage generated between the PMFE electrodes (176, 186).

Figure 11:
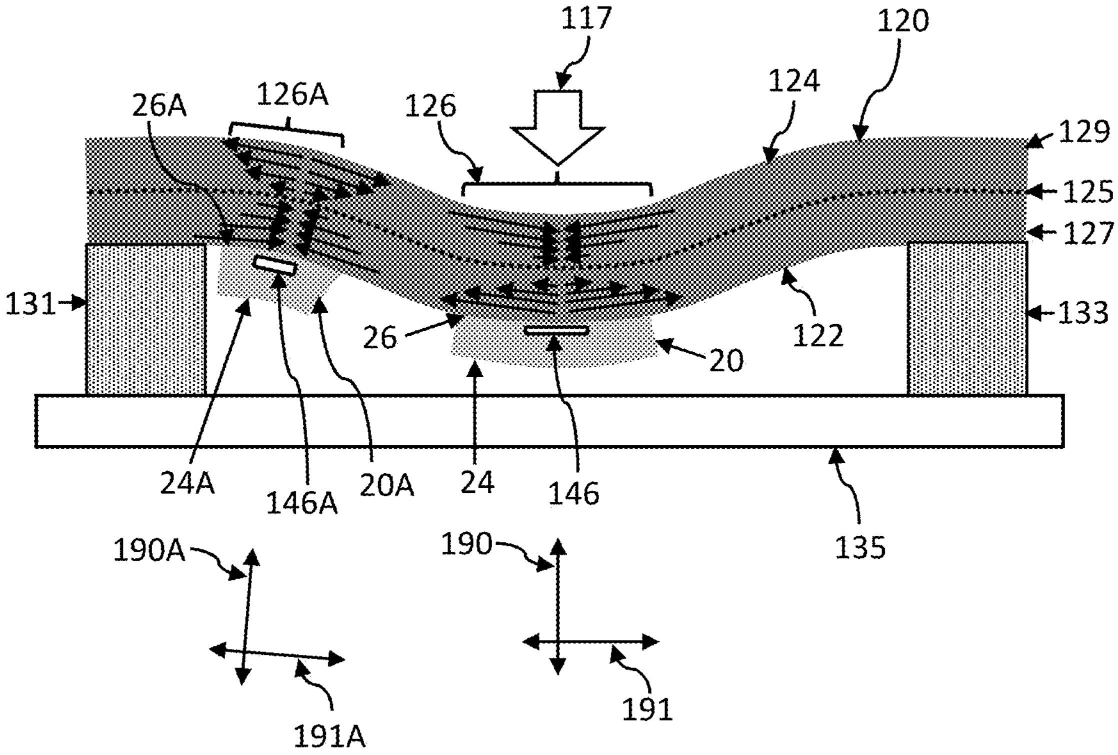
FIGS. 11, 12, and 13 are schematic side views of force-measuring and touch-sensing integrated circuits and a cover layer, attached to each other and undergoing deformation.
Figure 12:
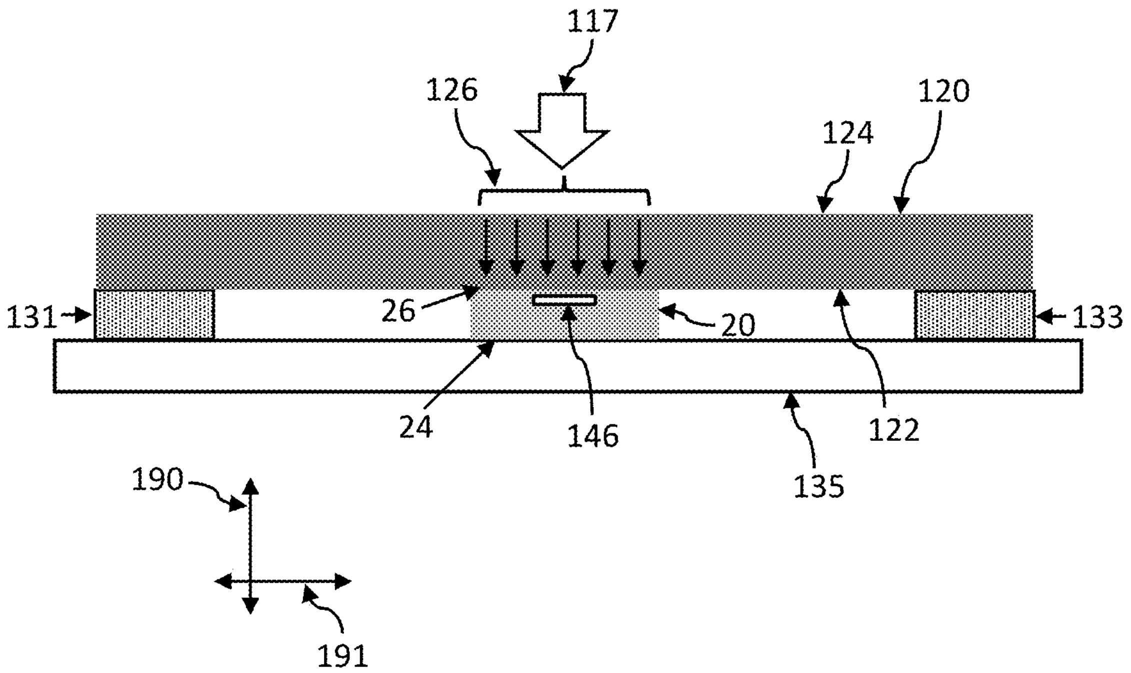
Figure 13:
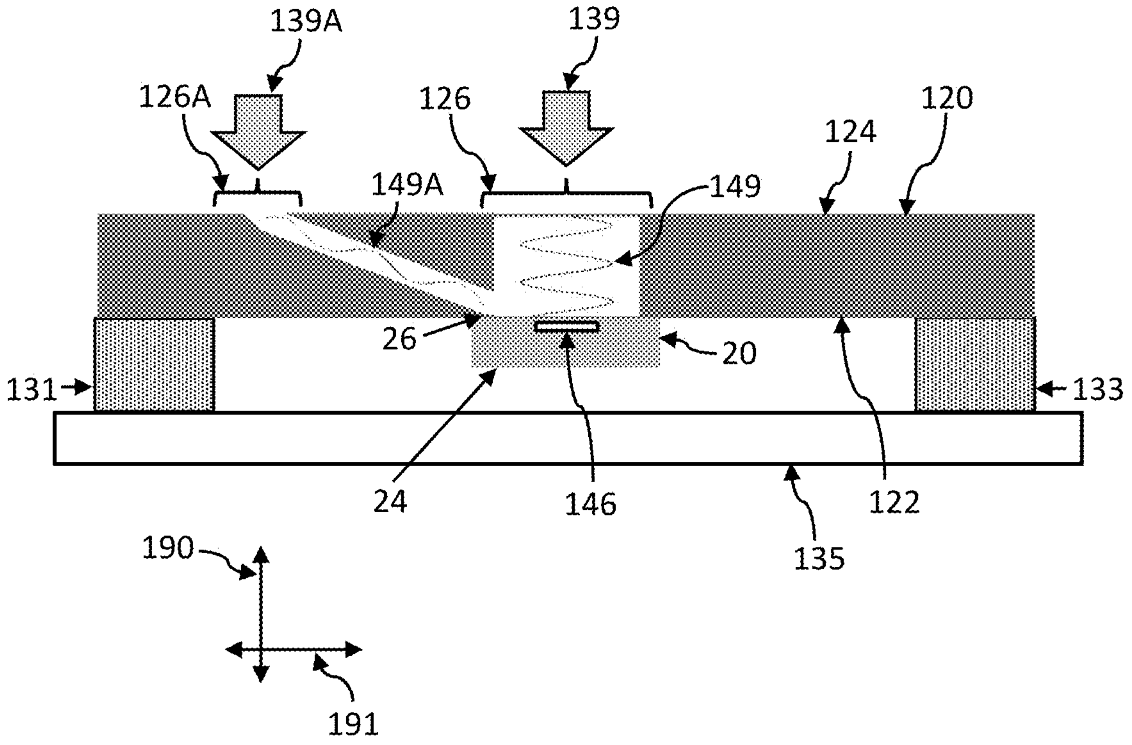

FIGS. 11, 12, and 13 are schematic side views of an FMTSIC 20 and a cover layer 120 attached to or adhered to (coupled to) each other. A top surface (ultrasound transmission surface) 26 of FMTSIC 20 is coupled to inner surface 122 of the cover layer 120. FMTSIC 20 and cover layer 120 overlie a rigid substrate 135. For ease of viewing, other components of system 100 (e.g., flexible circuit 108, ICs 114) have been omitted. FMTSIC 20 includes PMFEs 146. In the examples shown, two anchor posts 131, 133 fix the two ends of the cover layer 120 to the substrate 135.

In the example of FIG. 11, FMTSIC 20 is not anchored to the rigid substrate 135 and can move with the cover layer 120 when the cover layer 120 is deflected upwards or downwards. A downward force 117, shown as a downward arrow, is applied by a finger (or another object) pressing against the outer surface 124 of the cover layer 120 at the sense region 126 for example. A finger pressing against or tapping the outer surface 124 are examples of touch excitation, or more generally, excitation. In the example shown in FIG. 11, the cover layer 120 is deflected in a first direction (e.g., downwards) in response to a touch excitation at the sense region 126. FMTSIC 20 is located approximately half-way between the anchor posts 131, 133 and sense region 126 overlaps FMTSIC 20. A neutral axis 125 is located within the cover layer 120. A lower portion 127 of the cover layer 120, below the neutral axis 125, is under tensile (positive) strain at the sense region 126, represented by outward pointing arrows, primarily along lateral direction 191, perpendicular to the normal direction 190. The lateral direction 191 is approximately parallel to the piezoelectric layer 160 at the respective location of the piezoelectric layer 160 (at region 126). An upper portion 129 of the cover layer 120, above the neutral axis 125, is under compressive (negative) strain at the sense region 126, represented by inward pointing arrows, primarily along lateral direction 191. Since FMTSIC 20 is coupled to the inner surface 122, adjacent to the lower portion 127, the PMFEs 146 are also under tensile (positive) strain. Typically, the entire FMTSIC 20 may be deflected under the applied downward force 117. In the example shown in FIG. 11, the PMFEs 146 are under a positive strain, and the respective portions of the piezoelectric layer 160 at the PMFEs 146 undergo expansion along a lateral direction 191. As a result, an electrical charge is generated at each PMFE (146) between the respective PMFE electrodes (176, 186). This electrical charge is detectable as a first deflection voltage $V_{d1}$ (corresponding to strain of a certain polarity and magnitude). The polarity of the first deflection voltage $V_{d1}$ at a PMFE depends upon the polarity of the strain (positive strain (tensile) or negative strain (compressive)) at the respective portion of the piezoelectric layer between the respective PMFE electrodes of the PMFE. The magnitude of the first deflection voltage $V_{d1}$ at a PMFE depends upon the magnitude of the strain at the respective portion of the piezoelectric layer between the respective PMFE electrodes of the PMFE. Subsequently, when the downward force 117 is no longer applied to the sense region 126, the cover layer 120 deflects in a second direction opposite the first direction (e.g., upwards). This is detectable as a second deflection voltage $V_{d2}$ (corresponding to strain of a certain polarity and magnitude). The polarity of the second deflection voltage $V_{d2}$ at a PMFE depends upon the polarity of the strain at the respective portion of the piezoelectric layer between the respective PMFE electrodes of the PMFE. The magnitude of the second deflection voltage $V_{d2}$ at a PMFE depends upon the magnitude of the strain at the respective portion of the piezoelectric layer between the respective PMFE electrodes of the PMFE.

FIG. 11 shows a second FMTSIC 20A, including PMFEs 146A. A top surface (ultrasound transmission surface) 26A of FMTSIC 20A is coupled to inner surface 122 of the cover layer 120. FMTSIC 20A overlies the rigid substrate 135 and is located at a second region 126A, between anchor post 131 and first FMTSIC 20. Note that FMTSIC 20A is laterally displaced from the location where the downward force 117 is applied to the outer surface 124 (at sense region 126). The lower portion 127 of the cover layer 120 is under compressive (negative) strain at the second region 126A, represented by inward pointing arrows, primarily along the lateral direction 191A, perpendicular to the normal direction 190A. The lateral direction 191A is approximately parallel to the piezoelectric layer 160 at the respective location of the piezoelectric layer 160 (at second region 126A). The upper portion 129 of the cover layer 120 is under tensile (positive) strain at the second region 126A, represented by outward pointing arrows, primarily along the lateral direction 191A. Since FMTSIC 20A is coupled to the inner surface 122, adjacent to the lower portion 127, the PMFEs 146A are also under compressive (negative) strain. These examples illustrate that when the cover layer and the FMTSICs undergo deflection in response to a touch excitation at the outer surface, expansion and/or compression of the piezoelectric layer along the lateral direction may be induced by the deflection of the cover layer.

In the example shown in FIG. 12, the bottom surface 24 of FMTSIC 20 is anchored to the rigid substrate 135. When downward force 117 is applied to the outer surface 124 of the cover layer 120 at sense region 126, the portion of the cover layer 120 at the sense region 126 transmits the downward force along normal direction 190. The portion of the cover layer 120 at the sense region 126 and the FMTSIC 20 undergo compression along normal direction 190. Consequently, the PMFEs 146 including piezoelectric layer 160 are compressed along the normal direction 190, approximately normal to the piezoelectric layer 160. As a result, an electrical charge is generated between the PMFE electrodes (176, 186). This electrical charge is detectable as a voltage $V_c$ (corresponding to a strain of a certain polarity and magnitude) between the PMFE electrodes. The downward force 117 that causes this compression is applied during a touch excitation, such as tapping at or pressing against the outer surface 124. The pressing or the tapping can be repetitive. Typically, the entire FMTSIC 20 may undergo compression. Subsequently, the piezoelectric layer 160 relaxes from the compressed state. In other cases, there may also be compression along a lateral direction 191, or along other directions.

In the example shown in FIG. 13, FMTSIC 20 is not anchored to the rigid substrate 135. A downward force 139, shown as a downward arrow, is applied to the outer surface 124 of the cover layer 120 at the sense region 126. The downward force 139 is generated as a result of an impact of touch excitation at the sense region 126. For example, the downward force 139 is generated as a result of the impact of a finger (or another object) tapping the outer surface at the sense region 126. The touch excitation (e.g., tapping) can be repetitive. The impact of the touch excitation (e.g., tapping) generates elastic waves that travel outward from the location of the impact (on the outer surface 124 at sense region 126) and at least some of the elastic waves travel toward the inner surface 122. Accordingly, at least some portion 149 of the elastic waves are incident on the FMTSIC 20.

In general, an impact of a touch excitation (e.g., tapping) on a surface of a stack (e.g., cover layer) can generate different types of waves including pressure waves, shear waves, surface waves and Lamb waves. Pressure waves, shear waves, and surface waves are in a class of waves called elastic waves. Pressure waves (also called primary waves or P-waves) are waves in which the molecular oscillations (particle oscillations) are parallel to the direction of propagation of the waves. Shear waves (also called secondary waves or S-waves) are waves in which the molecular oscillations (particle oscillations) are perpendicular to the direction of propagation of the waves. Pressure waves and shear waves travel radially outwards from the location of impact. Surface waves are waves in which the energy of the waves are trapped within a short depth from the surface and the waves propagate along the surface of the stack. Lamb waves are elastic waves that can propagate in plates. When an object (e.g., a finger) impacts a surface of a stack, different types of clastic waves can be generated depending upon the specifics of the impact (e.g., speed, angle, duration of contact, details of the contact surface), the relevant material properties (e.g., material properties of the object and the stack), and boundary conditions. For example, pressure waves can be generated when an impact of a touch excitation at the outer surface is approximately normal to the outer surface. For example, shear waves can be generated when an impact of a touch excitation at the outer surface has a component parallel to the outer surface, such as a finger hitting the outer surface at an oblique angle or a finger rubbing against the outer surface. Some of these elastic waves can propagate towards the FMTSIC 20 and PMFEs 146. If the stack is sufficiently thin, then some portion of surface waves can propagate towards the FMTSIC 20 and PMFEs 146 and be detected by the PMFEs 146.

Accordingly, when elastic waves 149 are incident on the FMTSIC 20 and PMFEs 146, the elastic waves induce time-dependent oscillatory deformation to the piezoelectric layer 160 at the PMFE 146. This oscillatory deformation can include: lateral deformation (compression and expansion along the lateral direction 191 approximately parallel to piezoelectric layer 160), normal deformation (compression and expansion along the normal direction 190 approximately normal to the piezoelectric layer 160), and shear deformation. As a result, time-varying electrical charges are generated at each PMFE (146) between the respective PMFE electrodes (176, 186). These time-varying electrical charges are detectable as time-varying voltage signals. The signal processing circuitry amplifies and processes these time-varying voltage signals. Typically, the time-dependent oscillatory deformations induced by an impact of a touch excitation are in a frequency range of 10 Hz to 1 MHz. For example, suppose that elastic waves 149 include pressure waves incident on the PMFEs 146 along the normal direction 190; these pressure waves may induce compression (under a positive pressure wave) and expansion (under a negative pressure wave) of the piezoelectric layer 160 along the normal direction 190. As another example, suppose that elastic waves 149 include shear waves incident on the PMFEs 146 along the normal direction 190; these shear waves may induce compression and expansion of the piezoelectric layer 160 along the lateral direction 191.

Consider another case in which a downward force 139A, shown as a downward arrow, is applied to the outer surface 124 at a second region 126A, between anchor post 131 and FMTSIC 20. The downward force 139A is generated as a result of an impact of touch excitation at the second region 126A. The impact of the touch excitation generates elastic waves that travel outward from the location of the impact (region 126A) and at least some of the elastic waves travel towards the inner surface 122. Accordingly, at least some portion 149A of the elastic waves are incident on the FMTSIC 20, causing the piezoelectric layer 160 to undergo time-dependent oscillatory deformation. As a result, time-varying electrical charges are generated at each PMFE (146) between the respective PMFE electrodes (176, 186). These time-varying electrical charges are detectable as time-varying voltage signals, although the impact of the touch excitation occurred at a second region 126A that is laterally displaced from the sense region 126.

Elastic waves 149A that reach FMTSIC 20 from region 126A may be weaker (for example, smaller in amplitude) than elastic waves 149 that reach FMTSIC 20 from sense region 126, because of a greater distance between the location of impact and the FMTSIC. An array of PMFEs can be configured to be a position-sensitive input device, sensitive to a location of the impact (e.g., tapping) of a touch excitation. An array of PMFEs can be an array of PMFEs in a single FMTSIC or arrays of PMFEs in multiple FMTSICs. For example, a table input apparatus could have an array of FMTSICs located at respective lateral positions underneath the table's top surface, in which each FMTSIC would contain at least one PMFE and preferably multiple PMFEs. The signal processing circuitry can be configured to amplify and process the time-varying voltage signals from the PMFEs and analyze some features of those time-varying voltage signals. Examples of features of time-varying voltage signals are: (1) amplitudes of the time-varying voltage signals, and (2) the relative timing of time-varying voltage signals (the "time-of-flight"). For example, a PMFE exhibiting a shorter time-of-flight is closer to the location of impact than another PMFE exhibiting a longer time-of-flight. The signal processing circuitry can analyze features of time-varying signals (e.g., amplitude and/or time-of-flight) from the PMFEs in an array of PMFEs to estimate a location of impact of a touch excitation.

In operation, PMFE 146 is configured to output voltage signals between the PMFE electrodes (176, 186) in accordance with a time-varying strain at the respective portion of the piezoelectric layer between the PMFE electrodes (176, 186) resulting from a low-frequency mechanical deformation. A touch excitation at the cover layer or at another component mechanically coupled to the cover layer causes a low-frequency mechanical deformation (of the cover layer or other component at the point of excitation). The low-frequency mechanical deformation induces effects including deflection (as illustrated in FIG. 11), compression (as illustrated in FIG. 12), and/or elastic-wave oscillations (as illustrated in FIG. 13). In an actual touch event, more than one of these effects may be observable. Consider tapping by a finger as an example of a touch excitation. As the finger impacts the outer surface 124, elastic waves are generated which are detectable as time-varying voltage signals at the PMFEs (FIG. 13). Elastic waves are generated by the impact of the touch excitation. Subsequently, as the finger presses against the cover layer, the FMTSIC undergoes deflection (FIG. 11). There is expansion or compression of the piezoelectric layer along a lateral direction. The low-frequency mechanical deformation can be caused by a finger pressing against or tapping at outer surface of the cover layer 120, to which the FMTSIC 20 is attached (coupled). The PMFE 146 is coupled to the signal processing circuitry 137. By amplifying and processing the voltage signals from the PMFE at the signal processing circuitry, the strain that results from the mechanical deformation of the piezoelectric layer can be measured.

It is possible to adjust the relative amplitudes of the PMFE voltage signals attributable to the elastic-wave oscillations (FIG. 13) and lateral expansion and compression due to deflection (FIG. 11). For example, one can choose the cover layer to be more or less deformable. For example, the cover layer 120 of FIG. 13 may be thicker and/or made of more rigid material than the cover layer 120 of FIG. 11.

PMFE 146 is configured to output voltage signals between the PMFE electrodes (176, 186) in accordance with a time-varying strain at the respective portion of the piezoelectric layer between the PMFE electrodes (176, 186) resulting from a low-frequency mechanical deformation. Typically, the low-frequency deformation is induced by touch excitation which is not repetitive (repetition rate is effectively 0 Hz) or is repetitive having a repetition rate of 100 Hz or less, or 10 Hz or less. These repetition rates correspond to the repetition rates of a repetitive touch excitation, e.g., a finger repeatedly pressing against or tapping the sense region. An example of a repetition rate calculation is explained with reference to FIG. 20. In the example shown in FIG. 20, the repetition rate is approximately 2.4 Hz.

A touch excitation, or more generally, excitation can occur somewhere other than at the sense region. Consider an implementation of FMTSICs in a portable apparatus, such as a smartphone. In some cases, the cover layer, to which the FMTSIC is coupled, can be a portion of the smartphone housing, and in other cases, the housing and the cover layer can be attached to each other, such that forces applied to the housing can be transmitted to the cover layer. We can refer to both cases as a component (e.g., housing) being mechanically coupled to the cover layer. Excitation such as bending of, twisting of, pinching of, typing at, and tapping at the housing can also cause low-frequency mechanical deformation. For example, typing at the housing can include typing at a touch panel of the smartphone. There can be a time-varying strain (force) at a respective portion of the piezoelectric layer at a PMFE resulting from this low-frequency deformation.

Figure 14:
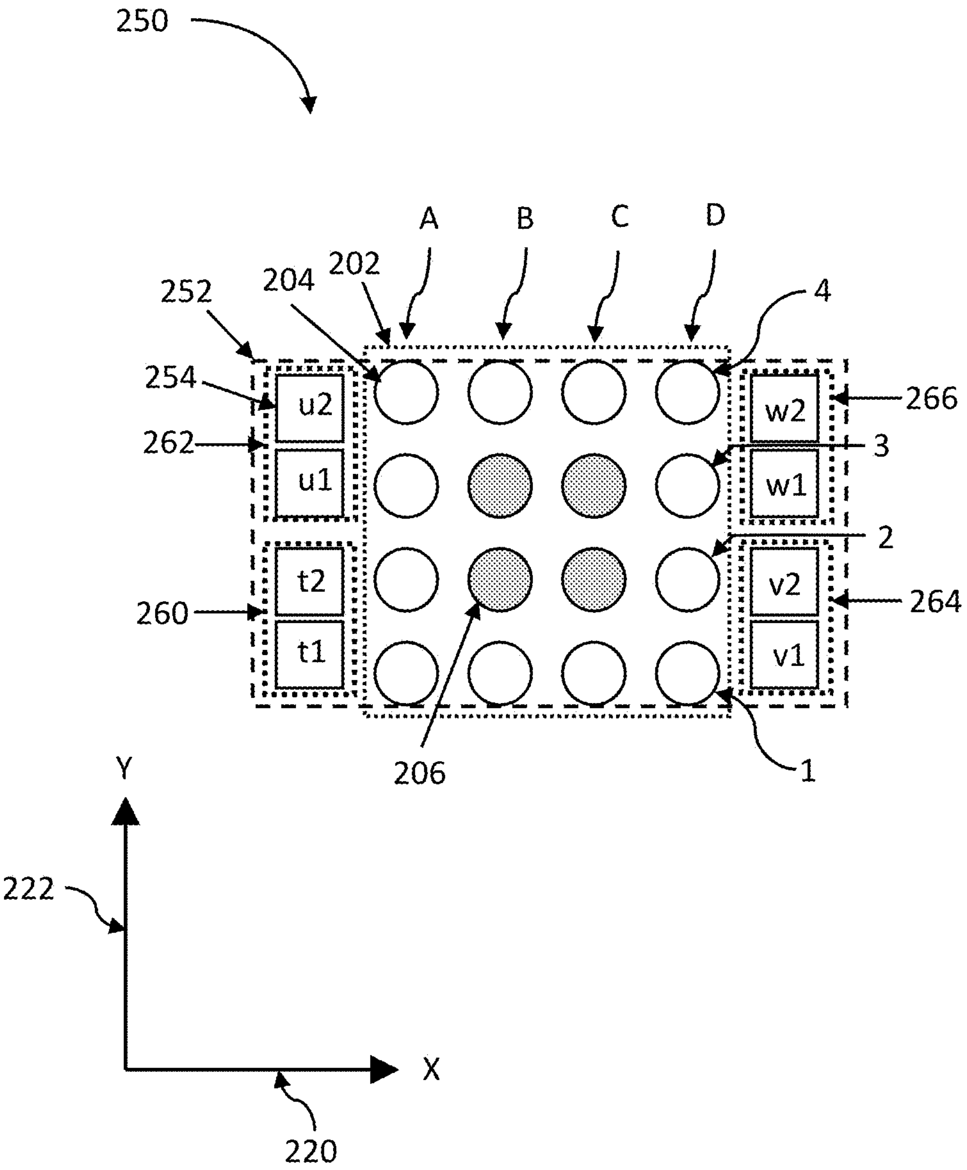
FIG. 14 is a schematic top view of a MEMS portion of a force-measuring touch-sensing integrated circuit.

An FMTSIC can contain multiple PMUT transmitters, PMUT receivers, and PMFEs. FIG. 14 is a top view of a MEMS portion 250 of an FMTSIC. The PMUTs (PMUT transmitters 204 shown as white circles and PMUT receivers 206 shown as grey circles) are arranged in a two-dimensional array, extending along the X-axis (220) and Y-axis (222). The PMUTs are arranged in columns (A, B, C, and D) and rows (1, 2, 3, and 4). In the example shown, the two-dimensional PMUT array 202 has a square outer perimeter, but in other examples the outer perimeter can have other shapes such as a rectangle. In the example shown, the total number of PMUTs is 16, of which 12 are PMUT transmitters 204 and 4 are PMUT receivers 206. In the example shown, the PMUT receivers number less than the PMUT transmitters. The PMUTs are shown as circles because the overlap area of the first (bottom) electrode 172 and the second (top) electrode 174 is approximately circular. In other examples, the overlap area can have other shapes, such as a square. In the example shown, the PMUTs are of the same lateral size (area), but in other examples PMUTs of different sizes are also possible.

The PMUT transmitters 204 are configured to transmit, upon application of voltage signals between the respective first PMUT electrode and the respective second PMUT electrode, ultrasound signals of a first frequency $F_1$, in longitudinal mode(s) propagating along a normal direction approximately normal to the thin-film piezoelectric stack and away from the cavities. A benefit to a two-dimensional array of PMUT transmitters is that by optimization of the voltage signals (timing and/or amplitudes) to each of the PMUT transmitters, the transmitted ultrasound signals can be made to interfere constructively to achieve a beam-forming effect if desired. The PMUT receivers 206 are configured to output, in response to ultrasound signals of the first frequency $F_1$ arriving along the normal direction, voltage signals between the respective first PMUT electrode and the respective second PMUT electrode. In the example shown, the piezoelectric capacitors constituting the PMUT receivers 206 are connected to each other in parallel. Since the capacitances of these PMUT receivers are added together, this arrangement of PMUT receivers is less sensitive to the effects of parasitic capacitance.

The MEMS portion includes eight PMFEs (254) arranged in a two-dimensional array 252. The PMFE array 252 has an opening, which is devoid of PMFEs, in which the PMUT array 202 is disposed. The PMFEs are arranged into four sets (260, 262, 264, and 266), where each set is associated with a different X and Y location. Therefore, the PMFE array 252 achieves a two-dimensional positional resolution of applied forces measurement. The PMFE array enables calculation of force-resolution features, discussed hereinbelow. Each PMFE set contains two PMFEs. In the example shown, set 260 contains t1 and t2, set 262 contains u1 and u2, set 264 ontains v1 and v2, and set 266 contains w1 and w2. The PMFEs in a set are electrically connected to each other. In this example, the piezoelectric capacitors constituting each PMFE in a set are connected to each other in series. An advantage to combining the touch-sensing (PMUTs) and force-measuring (PMFEs) functions into one integrated circuit device is that it becomes possible to distinguish between stationary objects that touch but do not apply significant force (e.g., water droplet on sense region 126) and moving objects that touch and apply significant force (e.g., finger).

The PMUT arrays shown in FIG. 14 illustrated examples of PMUT arrays configured to operate at a single frequency $F_1$, in which the PMUT transmitters transmit ultrasound signals at $F_1$ and the PMUT receivers are configured to receive ultrasound signals at frequency $F_1$. In other cases, PMUT arrays can be configured to operate at frequencies $F_1$ and $F_2$. For example, a PMUT array contains first PMUT transmitters configured to transmit ultrasound signals at a first frequency $F_1$, first PMUT receivers configured to receive ultrasound signals at a first frequency $F_1$, second PMUT transmitters configured to transmit ultrasound signals at a second frequency $F_2$, and second PMUT receivers configured to receive ultrasound signals at a second frequency $F_2$.

Figure 15:
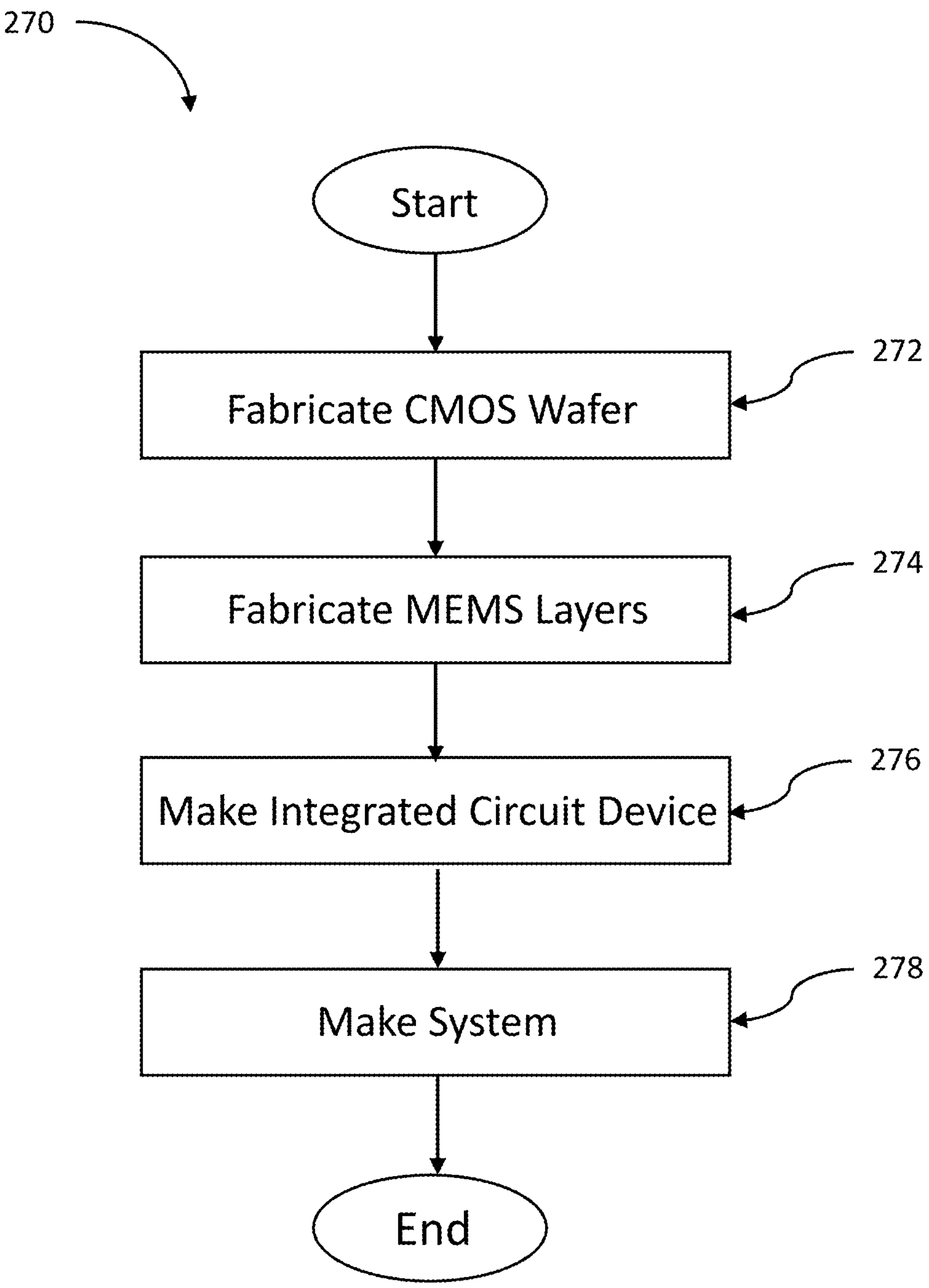
FIG. 15 is a flow diagram of a process of making a force-measuring and touch-sensing integrated circuit and a finger-touch input system.

FIG. 15 shows a flow diagram 270 for the process of making a FMTSIC 20 and a finger-touch input system. The method includes steps 272, 274, 276, and 278. At step 272, the ASIC portion 136 including signal processing circuitry 137 is fabricated on a semiconductor substrate (wafer) 150 using a CMOS fabrication process (FIG. 3). At step 274, the MEMS portion 134 is fabricated on top of the ASIC portion 136. At step 276, the integrated circuit device, FMTSIC 20, is made. This step 276 includes, for example, the singulation of the wafer into dies, the mounting of dies onto a package substrate, and the packaging of the die including application of an epoxy adhesive. The making of FMTSICs is complete at the end of step 276. Subsequently, a finger-touch input system is made at step 278. This step 278 includes, for example, the mounting of one or more FMTSICs and other ICs to a flexible circuit and/or printed circuit board (PCB) and adhering the FMTSICs to an interior surface of a cover layer of the apparatus.

Step 278 may include a testing procedure carried out on PMFE(s) after adhering the FMTSIC(s) to the interior surface of the cover layer. This testing procedure preferably includes the application of a testing force, in a range of 0.5 N to 10 N at the sense region. For example, suppose that upon application of a testing force of 7.5 N, a magnitude of the PMFE digital data (difference between maximum PMFE digital data (e.g., 542 in FIG. 20) and minimum PMFE digital data (e.g., 544 in FIG. 20)) is 1280 LSB. It is possible to calculate one or both of the following: (1) a ratio A of a magnitude of the PMFE digital data to a physical force value; and/or (2) a ratio B of a physical force value to a magnitude of the PMFE digital data. In this example, the ratio A=1280 LSB/7.5 N and the ratio B=7.5 N/1280 LSB. These ratios A and B permit a conversion between PMFE digital data (expressed in LSB) and a physical force value (applied force value) (expressed in Newtons). Another unit of force is gram-force. These ratios A and/or B can be stored in a memory store (non-volatile memory) of the respective FMTSIC.

Step 278 may include a testing procedure carried out on PMUT(s) after adhering the FMTSIC(s) to the interior surface of the cover layer. This testing procedure preferably includes contacting an object to the sense region (touch event) in which a force, in a range of 0.5 N to 10 N, is applied at the sense region. For example, suppose that upon contacting an object in which a testing force of 7.5 N is applied, the PMUT digital data decrease by 230 LSB (e.g., from the baseline 426 to a minimum signal 430 in FIG. 18). Accordingly, the dynamic range (difference between baseline and minimum signal) is 230 LSB under application of a testing force of 7.5 N. These dynamic range and testing force data can be stored in a memory store (non-volatile memory) of the respective FMTSIC.

Figure 16:
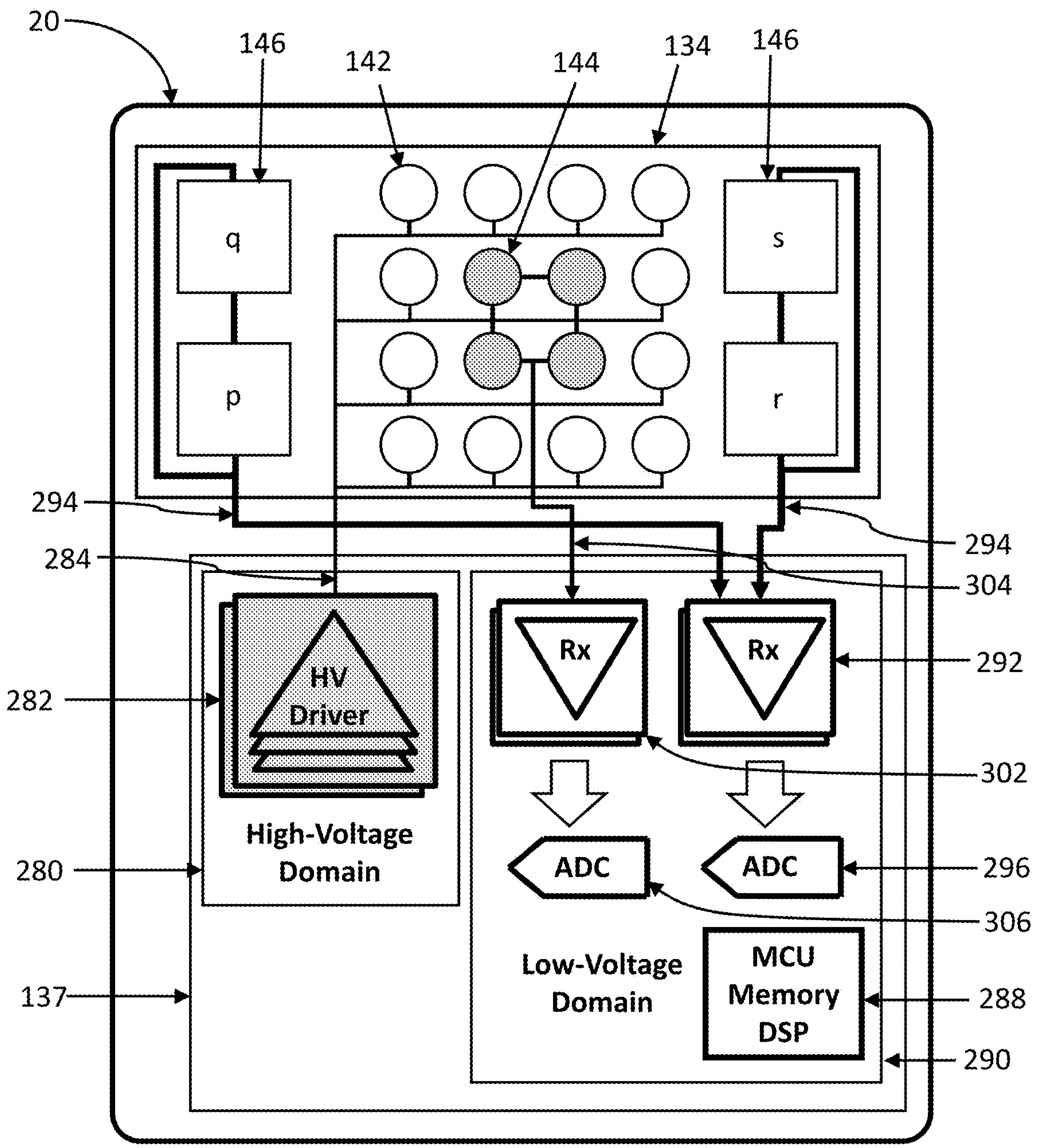
FIG. 16 is an electronics block diagram of a force-measuring and touch-sensing integrated circuit according to the present invention.

FIG. 16 is an electronics block diagram of the FMTSIC 20, including a MEMS portion 134 and signal processing circuitry 137. The MEMS portion includes PMUT transmitters 142, PMUT receivers 144, and PMFEs 146. Signal processing circuitry 137 includes a high-voltage domain 280 and a low-voltage domain 290. The high-voltage domain is capable of operating at higher voltages required for driving the PMUT transmitters. The high-voltage domain includes high-voltage transceiver circuitry 282, including high-voltage drivers. The high-voltage transceiver circuitry 282 is connected to the first PMUT electrodes and the second PMUT electrodes of the PMUT transmitters, via electrical interconnections (wiring) 284. The high-voltage transceiver is configured to output voltage pulses of 5 V or greater, depending on the requirements of the PMUT transmitters. The processing circuit blocks 288 are electrically connected to the high-voltage transceiver circuitry 282 and the analog-to-digital converters (ADCs) (296, 306). The processing circuit blocks 288 generate time-varying signals that are transmitted to the high-voltage transceiver circuitry 282. The high-voltage transceiver circuitry 282 transmits high-voltage signals to the PMUT transmitters 142 in accordance with the time-varying signals from the processing circuit blocks 288.

The low-voltage domain 290 includes amplifiers (292, 302) and analog-to-digital converters (ADCs) (296, 306). The processing circuit blocks 288 are also contained in the low-voltage domain 290. Voltage signals output by the PMUT receivers 144 (represented by gray circles) reach amplifiers 302 via electrical interconnections (wiring) 304 and get amplified by the amplifiers 302. The amplified voltage signals are sent to ADC 306 to be converted to digital signals which can be processed or stored by processing circuit blocks 288. Similarly, voltage signals output by PMFEs 146 reach amplifiers 292 via electrical interconnections (wiring) 294 and get amplified by the amplifiers 292. These amplified voltage signals are sent to ADC 296 to be converted to digital signals which can be processed or stored by processing circuit blocks 288. The processing circuit blocks 288 could be microcontrollers (MCUs), memories, and digital signal processors (DSPs), for example. The wiring (284, 294, 304) traverses the semiconductor substrate, which contains the signal processing circuitry 137, and the MEMS portion 134, which contains the PMFEs 146, the PMUT transmitters 142, and the PMUT receivers 144.

In the example shown (FIG. 16), the piezoelectric capacitors constituting the PMUT receivers 144 are connected to each other in parallel. Since the capacitances of these PMUT receivers are added together, this arrangement of PMUT receivers is less sensitive to the effects of parasitic capacitance. Accordingly, there is a unified voltage signal transmitted from the PMUT receivers 144 to the amplifiers 302. The piezoelectric capacitors constituting the PMUT transmitters 142 are connected in parallel. Accordingly, there is a time-varying signal transmitted from the high-voltage transceiver circuitry 282 to the PMUT transmitters 142. The PMFEs 146 are grouped into two sets (p and q on the left side, r and s on the right side), and the PMFEs in each set are connected to each other in series. Accordingly, there are two sets of PMFE signals transmitted from the PMFEs 146 to the amplifiers 292.

Figure 17:
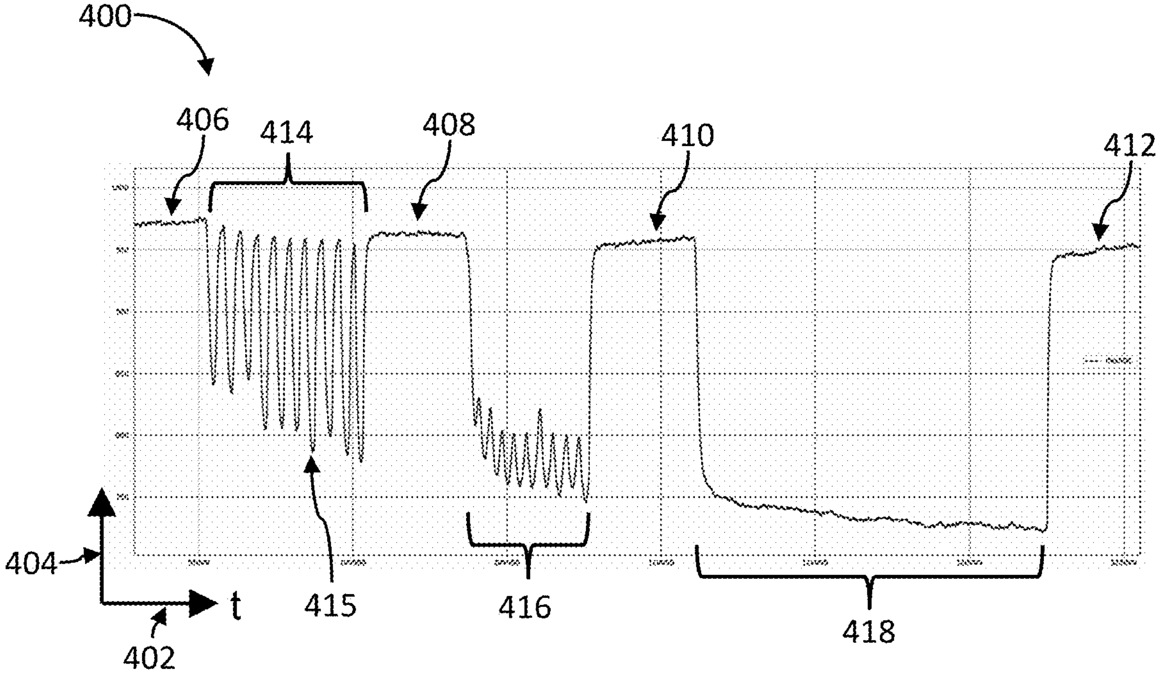
FIG. 17 is a diagram showing a graphical plot of example PMUT digital data over a longer time duration.

An example of a PMUT digital data is shown in FIG. 17, which shows graphical plot 400 of illustrative PMUT digital data, after ADC and before additional processing (e.g., high-pass filtering). The graphical plot has a horizontal axis 402 showing time t, in which 1 division corresponds to 5000 ms, and a vertical axis 404 showing PMUT digital data (e.g., data output from ADC 306 of FIG. 16). Graphical plot 400 includes sections 406, 414, 408, 416, 410, 418, and 412 (ordered sequentially). Graphical plot portions 406, 408, 410, and 412 correspond to time periods during which there is nothing touching or coming into contact with the sense region. These graphical plot sections 406, 408, 410, and 412 show the baseline signal, which exhibits a drift. Plot section 414 corresponds to repetitive pressing of a digit (e.g., a finger) on the sense region, wherein each valley 415 in the PMUT signal corresponds to one occurrence of the digit pressing at the sense region. In the example shown, plot section 414 shows 10 repetitions of the digit pressing at the sense region. After each repetition, the digit is completely released (removed) from the sense region. Plot section 416 also corresponds to repetitive pressing of the digit on the sense region, but after each repetition, the digit is not completely removed from the sense region. During the duration of plot section 416, the digit is in contact with the sense region. Plot section 418 corresponds to the digit touching the sense region and being held against the sense region continuously.

Figure 18:
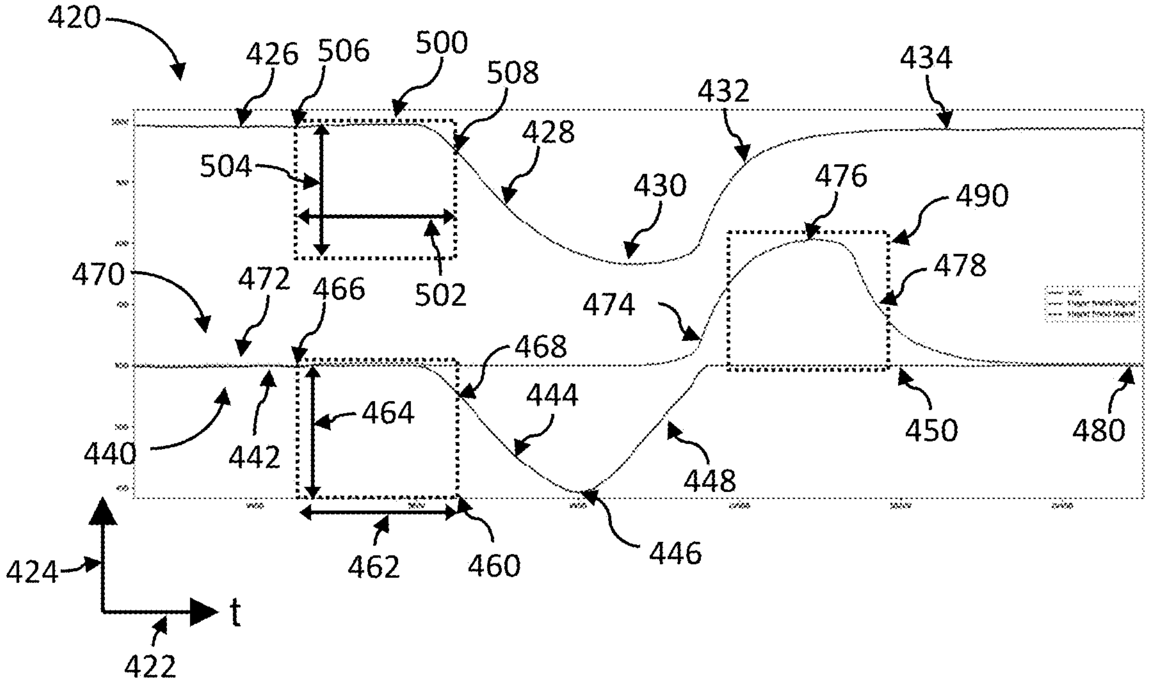
FIG. 18 is a diagram showing graphical plots of example PMUT digital data over a shorter time duration.

FIG. 18 shows graphical plots 420, 440, and 470 of illustrative PMUT digital data. The graphical plots have a horizontal axis 422 showing time t, in which 1 division corresponds to 200 ms, and a vertical axis 424 showing PMUT digital data. Graphical plot 420 is a graphical plot of PMUT digital data (e.g., data output from ADC 306 of FIG. 16, before additional processing) and corresponds to one occurrence of a digit pressing on the sense region and the digit being completely removed (released) from the sense region. Graphical plot 420 includes plot sections 426, 428, 430, 432, and 434 (ordered sequentially). Graphical plot portions 426 and 434 correspond to time periods during which there is nothing touching or coming into contact with the sense region. These graphical plot sections 426 and 434 show the baseline signal. During the duration of plot section 428, the PMUT digital signal is decreasing from the baseline (derivative of PMUT digital signal with respect to time is negative), approximately corresponding to the digit coming into contact with the sense region and the digit pressing at the sense region. The PMUT digital signal reaches a minimum at plot section 430. During the duration of plot section 432, the PMUT digital signal is increasing from the minimum (derivative of PMUT digital signal with respect to time is positive), approximately corresponding to the digit being released from the sense region.

Figure 21:
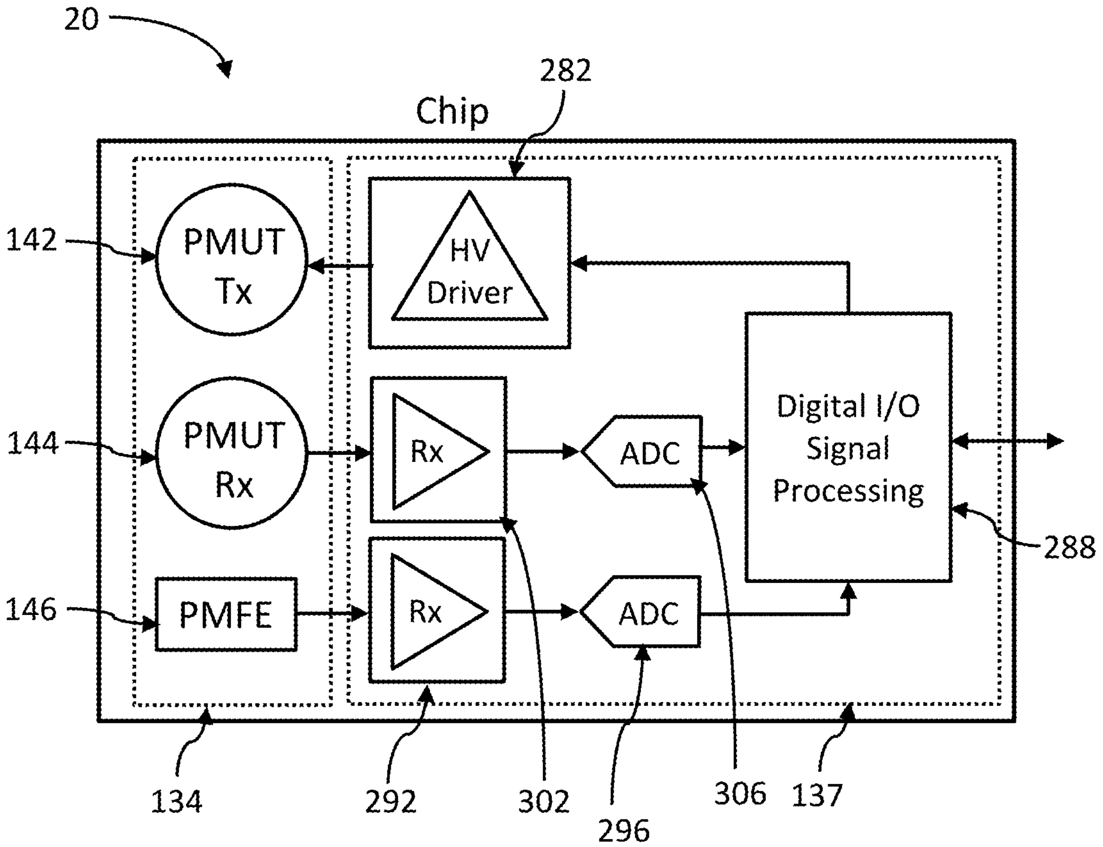
FIG. 21 is a block diagram of a force-measuring and touch-sensing integrated circuit.

The PMUT digital signal (420) undergoes additional processing. In the example shown in FIG. 18, there are two processed outputs (440, 470) from the PMUT digital signal. Plots 440, 470 show the PMUT digital signal 420 after passing through a high-pass filter as follows: plot 440 shows the high-pass filtered output that is less than or equal to 0 and plot 470 shows the high-pass filtered output that is greater than or equal to 0. The high-pass filter processing can be carried out on the output from the ADCs (e.g., ADC 306 of FIG. 16). The high-pass filtering process can be carried out at the processing circuit block 288 (FIGS. 16, 21).

Graphical plot 440 (negative-side high-pass filtered PMUT digital signal) includes plot sections 442, 444, 446, 448, and 450, ordered sequentially. Plot sections 442 and 450 show the baseline signal. During the duration of plot section 444, the high-pass filtered PMUT digital signal (negative side) is decreasing from the baseline. The high-pass filtered PMUT digital signal (negative side) reaches a minimum at plot section 446. During the duration of plot section 448, the high-pass filtered PMUT digital signal (negative side) is increasing from the minimum. Plot sections 444, 446, and 448 can correspond to an object, such as a digit, touching and pressing at the sense region. Accordingly, the negative-side high-pass filtered PMUT digital signal is sometimes referred to as a press signal.

Graphical plot 470 (positive-side high-pass filtered PMUT digital signal) includes plot sections 472, 474, 476, 478, and 480, ordered sequentially. Plot sections 472 and 480 show the baseline signal. During the duration of plot section 474, the high-pass filtered PMUT digital signal (positive side) is increasing from the baseline. The high-pass filtered PMUT digital signal (positive side) reaches a maximum at plot section 476. During the duration of plot section 478, the high-pass filtered PMUT digital signal (positive side) is decreasing from the maximum. Plot sections 474, 476, and 478 can correspond to an object, such as a digit, being released from the sense region. Accordingly, the positive-side high-pass filtered PMUT digital signal is sometimes referred to as a release signal or relief signal. An end of the plot section 448, corresponding to the negative-side high-pass filtered PMUT digital data increasing toward the baseline, and a beginning of the plot section 474, corresponding to the positive-side high-pass filtered PMUT digital data increasing from the baseline, occur approximately concurrently.

A moving time window can be applied to the PMUT digital data before high-pass filtering, shown as plot 420. An illustrative moving time window 500, at a particular time, is shown in FIG. 18. Moving time window 500 has a predetermined duration 502 and a predetermined dynamic range 504. In the example shown, the predetermined duration 502 is 200 ms. It is preferable that the predetermined duration be in a range of 100 ms to 300 ms. In the example shown, the predetermined dynamic range 504 corresponds to a difference between a minimum signal (data) 430 and the baseline signal (data) (426 or 434). It is preferable to set the predetermined dynamic range to be a dynamic range of the PUT digital data (in this example, the PMUT digital data) under application of a standard force in a range of 0.5 N to 10 N at the sense region. The term "standard force" refers to a force that may be exerted during a standard touch event, such as touching by a finger of a typical person. Preferably, the dynamic range of the PMUT digital data would be known from a previous measurement, such as during step 278 (FIG. 15) of making finger-touch input system.

A moving time window can be applied to the negative-side high-pass filtered PMUT digital data 440. An illustrative moving time window 460, at a particular time, is shown in FIG. 18. Moving time window 460 has a predetermined duration 462 and a predetermined dynamic range 464. In the example shown, the predetermined duration 462 is 200 ms. It is preferable that the predetermined duration be in a range of 100 ms to 300 ms. In the example shown, the predetermined dynamic range 464 corresponds to a difference between a minimum signal (data) 446 and the baseline signal (data) (442 or 450). It is preferable to set the predetermined dynamic range to be a dynamic range of the PMUT digital data (in this example, the negative-side high-pass filtered PMUT digital data) under application of a standard force in a range of 0.5 N to 10 N at the sense region. Similarly, a moving time window (490) can be applied to the positive-side high-pass filtered PMUT digital data.

Boolean data indicating a measurable reduction in the PMUT digital data from the PMUT receivers (e.g., 144 in FIGS. 16 and 21) can be derived. We refer to this Boolean data as "PMUT Triggered" Boolean data because it is an indication or suggestion of a finger-touch event at the sense region corresponding to the PMUT receivers. A moving time window (500, 460) can be applied to PMUT digital data before high-pass filtering 420 or to negative-side high-pass filtered PMUT digital data 440. In the examples shown, the change of PMUT digital data U(t) in the moving time window (460 or 500) is the difference in vertical axis values at a point (466 or 506) at the end of the respective time windows 460, 500 and a point (468 or 508) at the beginning of the respective time windows 460, 500. As shown in FIG. 18, the PMUT digital data U(t) is decreasing in the respective time windows (460 or 500). A minimum decrease percentage (threshold) is set to be at least 1%, and preferably at least 2%, of the predetermined dynamic range. If the PMUT digital data U(t) decreases by at least the minimum decrease percentage of the predetermined dynamic range in the moving time window of the predetermined duration, "PMUT Triggered" is set to True. If the PMUT digital data U(t) does not decrease by at least the minimum decrease percentage of the predetermined dynamic range in the moving time window of the predetermined duration, "PMUT Triggered" is set to False. The moving time window can be applied to PMUT digital data that exhibit a decrease in signal in response to an object contacting the sense region.

Figure 19:
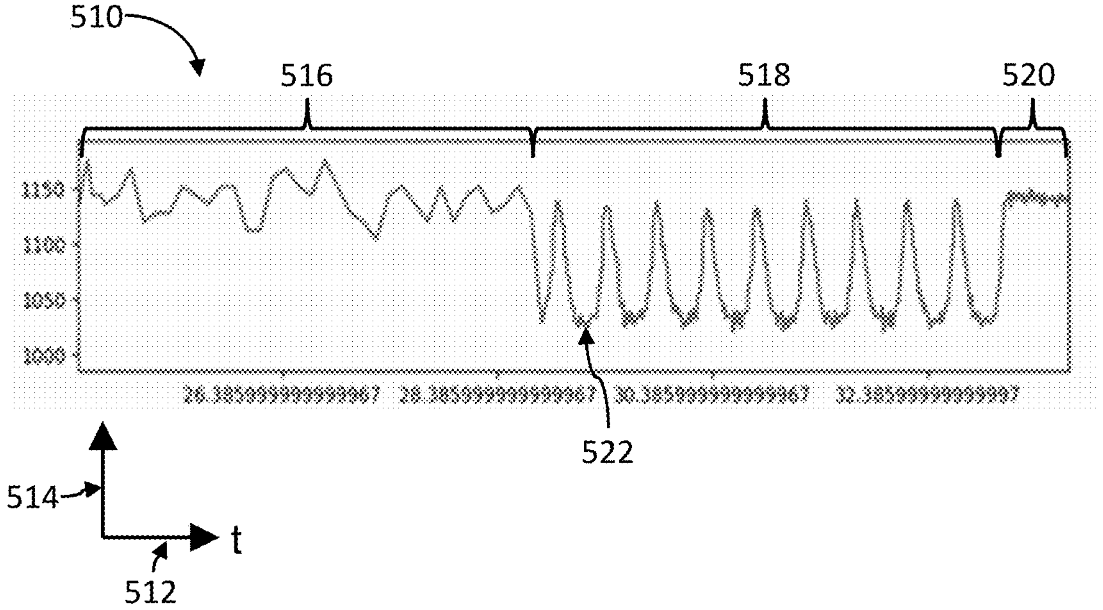
FIGS. 19 and 20 are diagrams showing graphical plots of PMUT digital data and PMFE digital data, respectively, in response to an example touch event.

FIG. 19 shows a graphical plot 510 of illustrative PMUT digital data during a repetitive touch event. Graphical plot 510 has a horizontal axis 512 showing time t, in which 1 division corresponds to 2.0 sec, and a vertical axis 514 showing PMUT digital data, after ADC and before high-pass filtering. Graphical plot 510 includes plot sections 516, 518, and 520 (ordered sequentially). Graphical plot portions 516 and 520 correspond to time periods during which there is nothing touching or coming into contact with the sense region. These graphical plot sections 516 and 520 show the baseline signal. Plot section 518 corresponds to repetitive pressing of a digit (e.g., a finger) on the sense region, wherein each valley 522 in the PMUT signal corresponds to one occurrence of the digit pressing at the sense region. In the example shown, plot section 518 shows 10 repetitions of the digit pressing at the sense region. After each repetition, the digit is completely released (removed) from the sense region. As shown in FIG. 19, the 10 repetitions of the digit pressing at the sense region occur during a time period of approximately 4.1 sec. Accordingly, the repetition rate is approximately 2.4 Hz.

Figure 20:
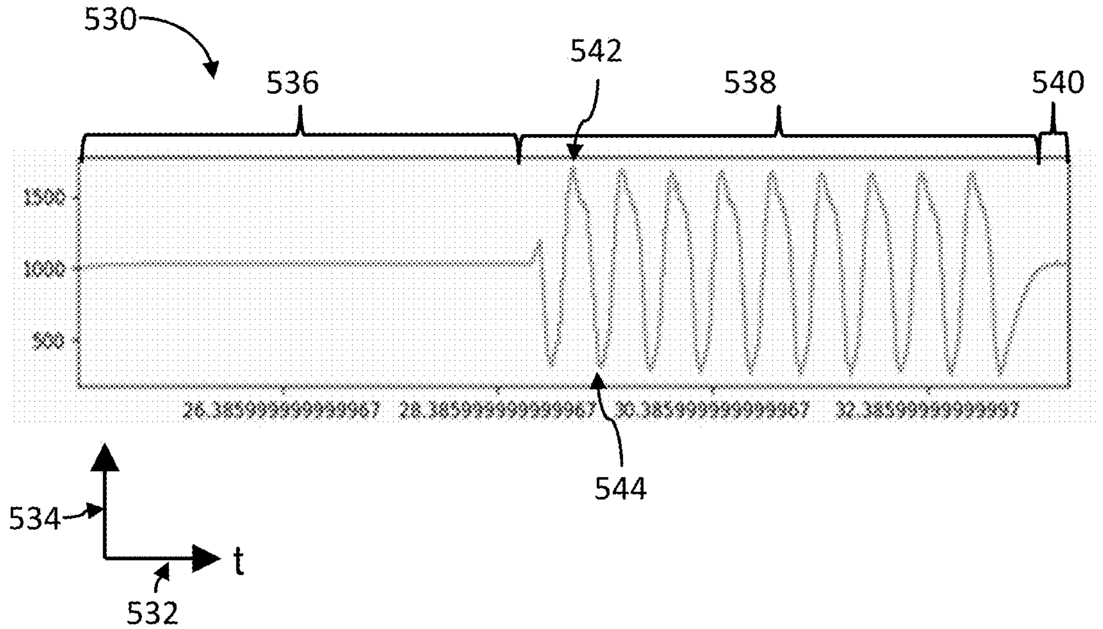

FIG. 20 shows a graphical plot 530 of illustrative PMFE digital data during the repetitive touch event shown in FIG. 19. Graphical plot 530 has a horizontal axis 532 showing time t, in which 1 division corresponds to 2.0 sec, and a vertical axis 534 showing PMFE digital data. Graphical plot 530 includes plot sections 536, 538, and 540 (ordered sequentially). Graphical plot portions 536 and 540 correspond to time periods during which there is nothing touching or coming into contact with the sense region. These graphical plot sections 536 and 540 show the baseline signal. Plot section 538 corresponds to repetitive pressing of a digit (e.g., a finger) on the sense region, analogous to plot section 518 of FIG. 19. There is a pair of maximum PMFE digital data 542 and a minimum PMFE digital data 544 (occurring after 542) corresponding to one repetition of a digit pressing at the sense region and the digit being removed from the sense region. As the digit presses the sense region, the PMFE(s) undergo a first deformation resulting in a first PMFE signal, and as the digit is removed from the sense region, the PMFE(s) undergo a second deformation resulting in a second PMFE signal. In this case, the first and second deformations are in opposite directions and the first and second PMFE signals are of opposite polarities relative to the baseline signal. As illustrated in the example of FIG. 11, the first deformation can be a first deflection during which a first deflection voltage $V_{d1}$ (corresponding to strain of a certain polarity and magnitude) is detectable. The second deformation can be a second deflection during which a second deflection voltage $V_{d2}$ (corresponding to strain of a certain polarity and magnitude) is detectable. As shown in FIG. 20, the 10 repetitions of the digit pressing at the sense region occur during a time period of approximately 4.1 sec. Accordingly, the repetition rate is approximately 2.4 Hz.

FIG. 21 is a block diagram of the FMTSIC 20, which is an example of a force-measuring and touch-sensing integrated circuit. FMTSIC 20 includes a MEMS portion 134 and signal processing circuitry 137 (in the ASIC portion). The MEMS portion 134 includes PMUT transmitters 142, PMUT receivers 144, and PMFEs 146. Signal processing circuitry 137 includes a high-voltage domain and a low-voltage domain. The high-voltage domain is capable of operating at higher voltages required for driving the PMUT transmitters. The high-voltage domain includes high-voltage transceiver circuitry 282, including high-voltage drivers. The high-voltage transceiver circuitry 282 is electrically connected to the first PMUT electrodes and the second PMUT electrodes of the PMUT transmitters. The high-voltage transceiver is configured to output voltage pulses of 5 V or greater, depending on the requirements of the PMUT transmitters. The low-voltage domain includes amplifiers (292, 302), analog-to-digital converters (ADCs) (296, 306), and processing circuit blocks 288. The processing circuit blocks 288 can include microcontrollers (MCUs), memories, and digital signal processors (DSPs), for example.

There may be additional processing circuits located off-chip that are connected to the processing circuit blocks 288. Such additional processing circuits can be contained in other ICs 114 in FIG. 1.

The processing circuit blocks 288 are electrically connected to the high-voltage transceiver circuitry 282 and the ADCs (296, 306). The processing circuit blocks 288 generate time-varying signals that are transmitted to the high-voltage transceiver circuitry 282. The high-voltage transceiver circuitry transmits high-voltage signals to the PMUT transmitters 142 in accordance with the time-varying signals from the processing circuit blocks. Voltage signals output by the PMUT receivers 144 reach amplifiers 302 that are electrically connected to PMUT receivers 144 and get amplified by the amplifiers 302. The amplified voltage signals are sent to ADC 306 to be converted to digital signals (PMUT digital data) which can be processed or stored by the processing circuit blocks 288. Similarly, voltage signals output by PMFEs 146 reach amplifiers 292 that are electrically connected to PMFEs 146 and get amplified by the amplifiers 292. These amplified voltage signals are sent to ADC 296 to be converted to digital signals (PMFE digital data) which can be processed or stored by processing circuit blocks 288.

Figure 22:
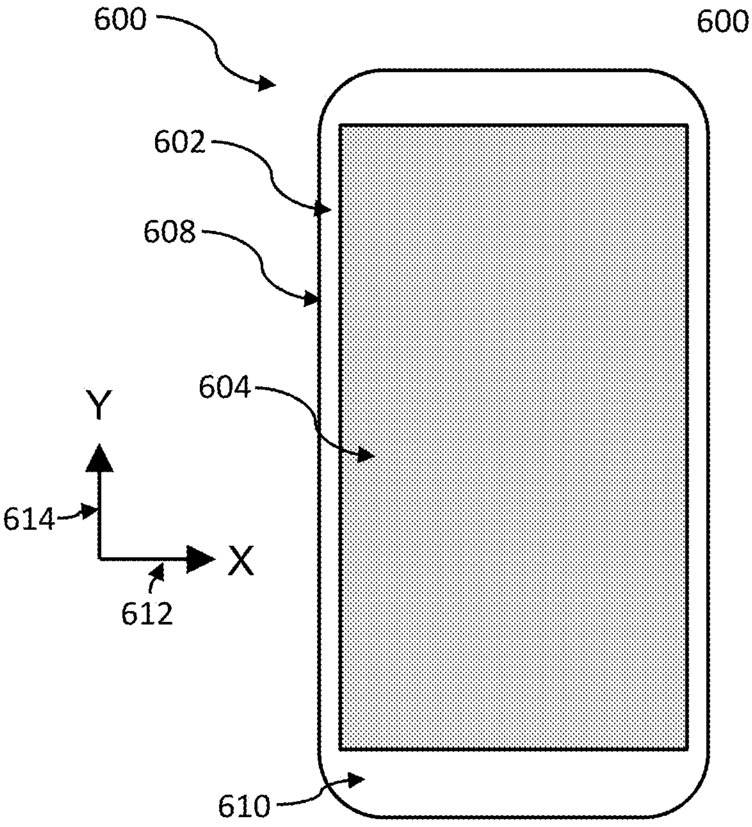
FIGS. 22, 23, and 24 are schematic views of an illustrative smartphone according to the present invention.
Figure 24:
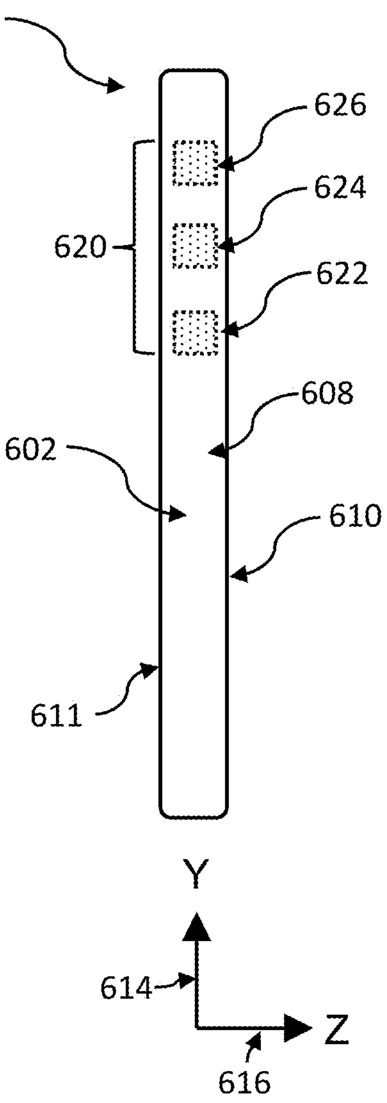
Figure 23:
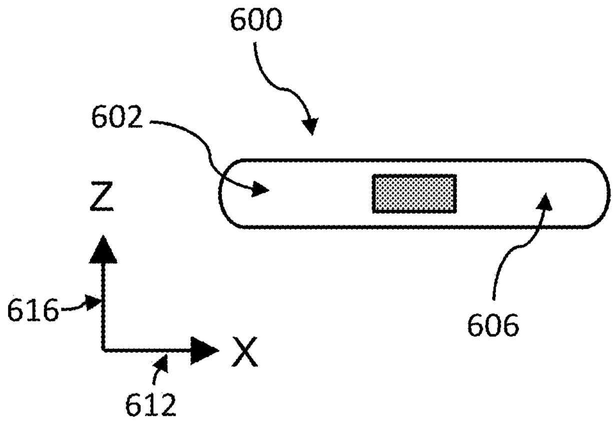

A multi-virtual button finger-touch input system can be implemented in a smartphone for example. A smartphone 600 is shown in FIGS. 22, 23, and 24. FIG. 22 shows a housing 602 including a front face 610 and a flat panel display 604. FIG. 23 shows a bottom face 606 of the housing 602. FIG. 24 shows a side face 608 of the housing, extending between the front face 610 and the back face 611. For FIGS. 22, 23, and 24, X-axis 612, Y-axis 614, and Z-axis 616 are shown to illustrate the relative orientations of the elements of the smartphone 600. There are virtual buttons 622, 624, and 626 (collectively, 620) corresponding to respective regions of the side face 608. These virtual buttons 620 are distinguished from mechanical buttons that might be embedded in respective openings in the side face 608. There are no cut-out openings in the side face 608 corresponding to the virtual buttons 620. A virtual button corresponds to a sense region of one or more FMTSICs at the virtual button.

Figure 25:
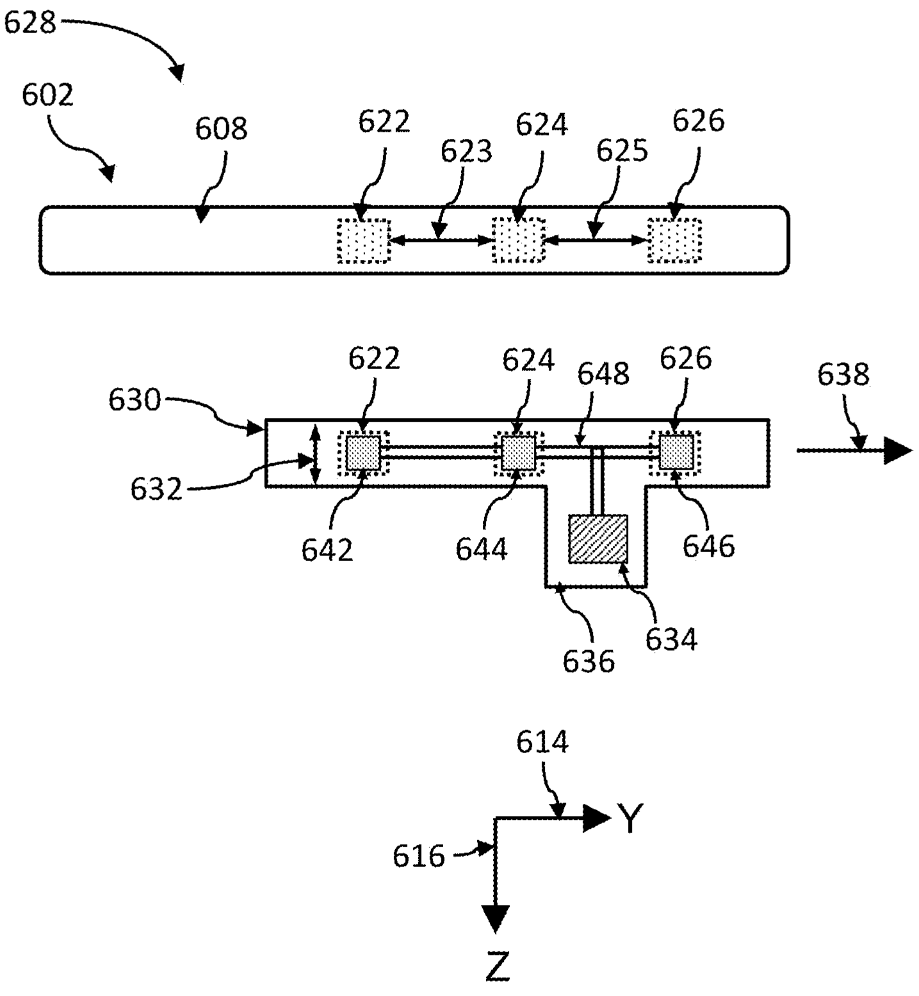
FIGS. 25 and 26 are schematic views of elements of a multi-virtual button finger-touch input systems according to the present invention.

FIG. 25 shows schematic views of certain elements of a multi-virtual button (VB) finger-touch input system 628. The touch input system 628 includes the housing 602 (the side face 608 and the virtual buttons 622, 624, and 626 are shown). The virtual buttons 622, 624, and 626 are separated from each other by respective distances 623, 625, which are preferably greater than a finger-touch zone. The touch input system 628 additionally includes a plurality of force-measuring and touch-sensing integrated circuits (FMTSICs), an elongate flexible circuit 630 which includes digital bus wiring 648, and a host controller 634. For example, the digital bus wiring 648 can implement the $I^2C$ protocol. In the example shown, there are three FMTSICs (642, 644, and 646), with each of the FMTSICs corresponding to a respective one of the virtual buttons (622, 624, and 626). The FMTSICs (642, 644, and 646) are mounted to the elongate flexible circuit 630 at a respective position thereof and are coupled to the digital bus wiring 648. The host controller 634 is in communication with each of the FMTSICs via the digital bus wiring 648. In the example shown, the host controller 634 is implemented as an integrated circuit (IC) and is mounted to a widened portion 636 of the elongate flexible circuit. In other examples, the host controller can be another microprocessor or microcontroller, such as a main microprocessor of a smartphone or other electronic apparatus.

For case of illustration, FIG. 25 shows the side face 608 and elongate flexible circuit 630 laterally displaced from each other. In actual implementation, the side face 608 and elongate flexible circuit 630 would overlap. The side face 608 of the housing 602 is an example of a cover layer (FIG. 1). In this case, the cover layer is a portion (i.e., the side face portion) of the housing. In other cases, the housing may be a component separate from the cover layer, and the housing and the cover layer may be attached to each other such that forces applied to the housing are transmitted to the cover layer. We refer to both cases as the housing being mechanically coupled to the cover layer. The FMTSICs are coupled to the inner surface of the cover layer (housing) at a respective position, such that each of the FMTSICs corresponds to a respective one of the virtual buttons, and each of the virtual buttons corresponds to a respective region of the cover layer.

In the example shown, the FMTSICs (642, 644, and 646) are arrayed along a longitudinal direction 638 of the elongate flexible circuit 630. Each FMTSIC typically has a lateral dimension (in FIG. 25, along the Y-axis 614 or along the Z-axis 616) of 3 mm or less, or 2.6 mm or less. Preferably, all of the analog data measured at the FMTSICs are converted to digital data at the respective FMTSIC and the data transmitted between the respective FMTSIC and the host controller can be entirely digital data. This precludes the need for any analog data wiring between the FMTSICs and the host controller. Accordingly, it is possible for a width 632 of the elongate flexible circuit 630 along a transverse direction (along Z-axis 616) at one or more of the FMTSICs (642, 644, 646) to be no greater than 3 mm. In the case that the host controller is implemented as a host controller IC mounted to the elongate flexible circuit, there would be no need for any analog input/output pin on the host controller IC.

Figure 26:
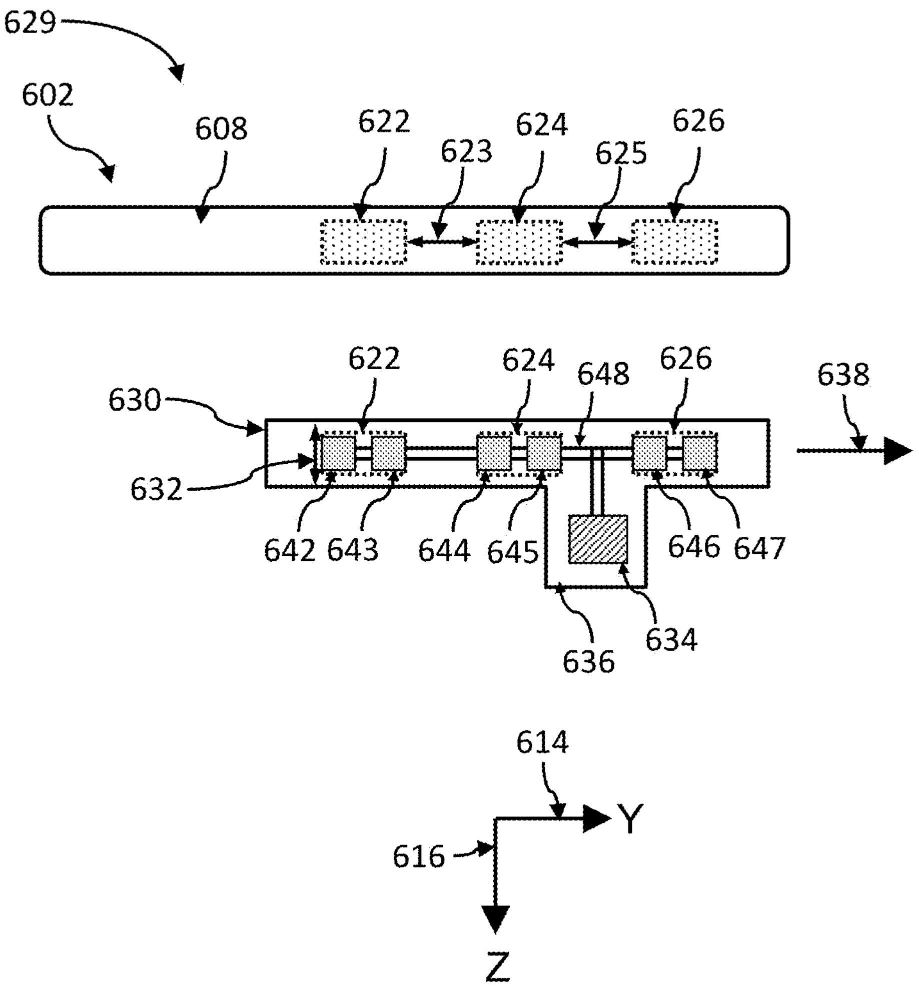

FIG. 26 shows schematic views of certain elements of a multi-VB finger-touch input system 629, which is similar to touch input system 628 (FIG. 25) in some respects. Touch input system 629 differs from touch input system 628 in that there are six FMTSICs (642, 643, 644, 645, 646, and 647). There are two FMTSICs corresponding to a respective one of the virtual buttons. FMTSICs 642 and 643 correspond to VB 622, FMTSICs 644 and 645 correspond to VB 624, and FMTSIC 646 and 647 correspond to VB 626. There can be two or more FMTSICs corresponding to each of the virtual buttons. In the case that there are two or more FMTSICs corresponding to one virtual button, such FMTSICs are preferably separated from each other by a distance smaller than a finger-touch zone.

A touch input system (e.g., 628 or 629) can be used to carry out methods of detecting a finger-touch event at one of a plurality of virtual buttons. The methods are illustrated using flow diagrams in FIGS. 27, 28, 29, and 30. Method 700 (FIG. 27) includes steps 702, 704, 706, 708, 710, 712, 714, 716, 718, and 720. Step 702 relates generally to configuring the touch input system, as explained with reference to FIGS. 25 and 26. Step 702 includes configuring a cover layer having an outer surface which can be touched by a finger and an inner surface opposite the outer surface, such that each of the virtual buttons correspond to a respective region of the cover layer. Step 702 additionally includes configuring a plurality of force-measuring and touch-sensing integrated circuits (FMTSICs). Each of the FMTSICs is coupled to the inner surface of the cover layer at a respective position, and each of the FMTSICs is coupled to a digital bus wiring 648. Step 702 additionally includes providing a host controller 634, in communication with each of the FMTSICs via the digital bus wiring 648.

At step 704, an event, which can be a finger-touch event or a false-trigger event, occurs. Events can occur repeatedly. Examples of finger-touch events include: touch by a bare finger, touch by a non-porous glove-covered finger, and touch by a porous glove-covered finger. A finger-touch event includes a finger (e.g., a bare finger, non-porous glove-covered finger, or porous glove-covered finger being brought into contact (touching and/or pressing) the cover layer at one of the virtual buttons. An example of a non-porous glove is a leather glove and an example of a porous glove is a cotton glove. It has been difficult to detect touch by a glove-covered finger, particularly a porous-glove covered finger, because there may only be a small or negligible change in the reflected ultrasound signal. An example of a false-trigger event is liquid droplet(s) on the cover layer at one or more virtual buttons.

Method 700 has two branches: a first branch relating to operation of the PMUTs (PMUT transmitters and PMUT receivers) at steps 706, 708, and 710 and a second branch relating to operation of the PMFEs at steps 712 and 714. The first and second branches are carried out concurrently and repeatedly. An event (step 704) can occur at some time while the first and second branches are being carried out. At step 706, the PMUT transmitters of each of the FMTSICs transmit ultrasound signals towards the cover layer. At least some of the ultrasound signals are reflected at the outer surface of the cover layer, resulting in reflected ultrasound signals. Voltage signals are output by the PMUT receivers of each of the FMTSICs (PMUT voltage signals) in response to reflected ultrasound signals arriving from the cover layer. At step 710, the PMUT voltage signals at each of the FMTSICs are converted by the signal processing circuitry of the respective FMTSIC to PMUT digital data. At step 712, voltage signals are output by the PMFEs of each of the FMTSICs (PMFE voltage signals) in response to a low-frequency mechanical deformation of the respective FMTSIC. At step 714, the PMFE voltage signals at each of the FMTSICs are converted by the signal processing circuitry of the respective FMTSIC to PMFE digital data.

Figure 30:
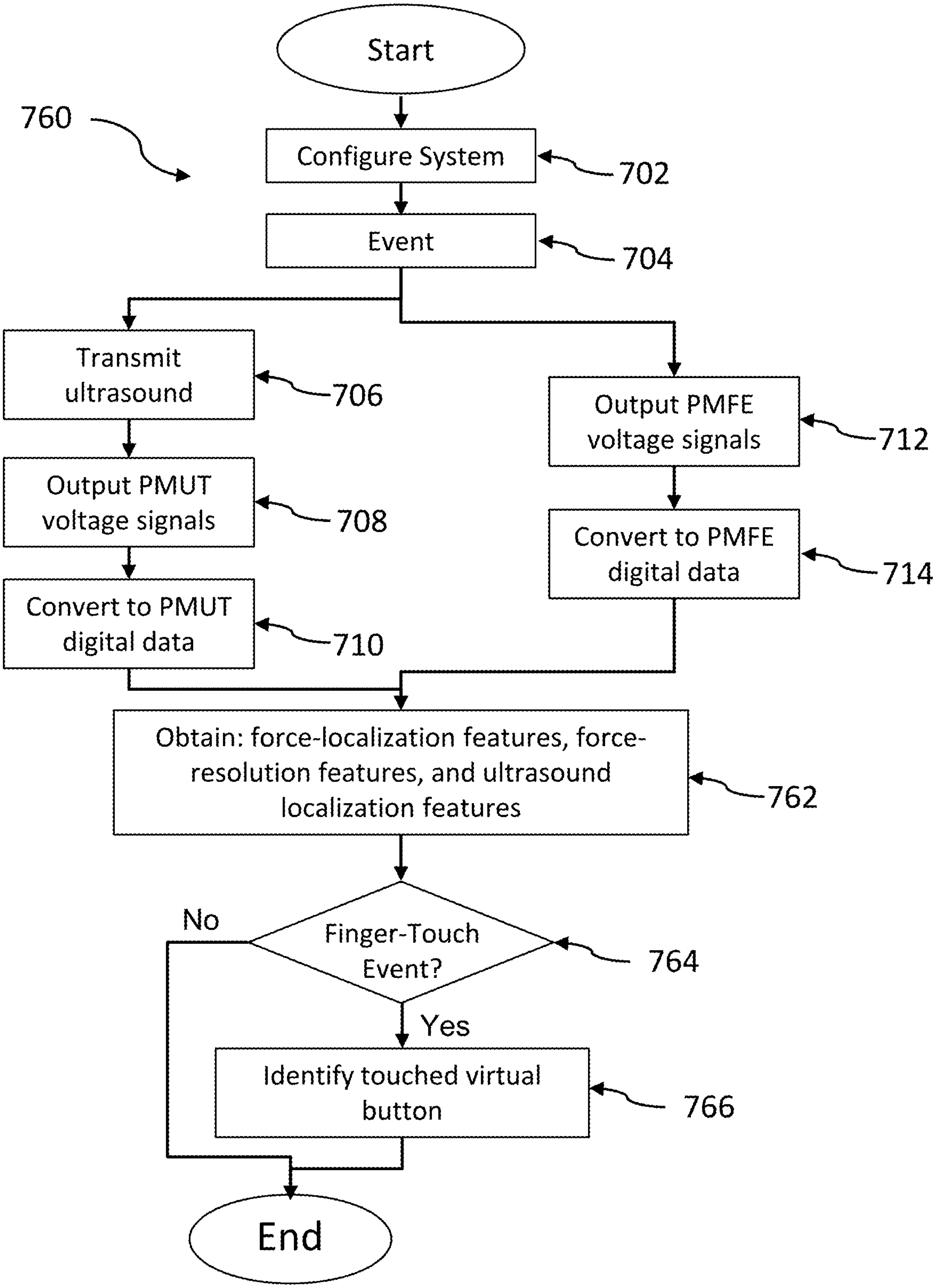
FIG. 30 is a flow diagram of a method of detecting a finger-touch event at a one of a plurality of virtual buttons, using force-localization features, force-resolution features, and ultrasound-localization features.

At step 716, the host controller obtains force-localization features and ultrasound-localization features of the FMTSICs. The process flow of the data is shown schematically in FIG. 40. PMUT digital data 1032, 1036 and PMFE digital data 1034, 1038 are generated at the respective FMTSICs 772, 776. Ultrasound localization features 770 are derived from the PMUT digital data 1032, 1036 of the respective FMTSICs 772, 776 and force-localization features 780 are derived from the PMFE digital data 1034, 1038 of the respective FMTSICs 772, 776. Additionally, force-resolution features 790 can be derived from the PMFE digital data 1034, 1038 of the respective FMTSICs 772, 776. Force-resolution features 790 are not needed for method 700 (FIG. 27) but are needed for method 760 (FIG. 30).

Figure 31:
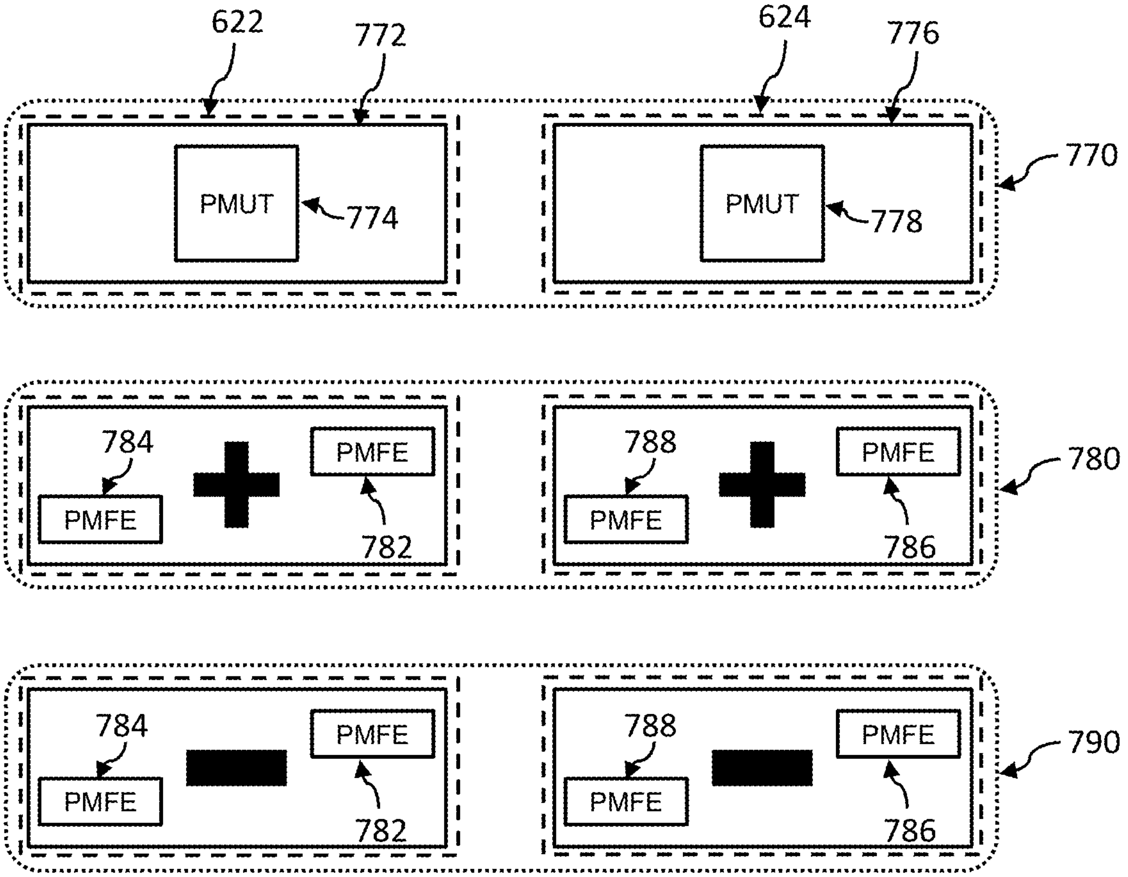
FIG. 31 is a schematic diagram of an implementation of ultrasound-localization features, force-localization features, and force-resolution features at two virtual buttons.

Implementations of ultrasound-localization features, force-localization features, and force-resolution features, at two virtual buttons are shown in FIG. 31. There is one FMTSIC 772, 776 corresponding to each of the virtual buttons 622, 624. Each FMTSIC 772, 776 includes PMUTs 774, 778 near its center, PMFEs 782, 786 near its upper right corner, and PMFEs 784, 788 near its lower left corner. Ultrasound-localization features 770 indicate the localization of ultrasound data among the FMTSICs 772, 776. An example of ultrasound-localization features is “PMUT Triggered” Boolean data of each of the FMTSICs. For example, the ultrasound-localization features 780 might indicate “PMUT Triggered” is True at FMTSIC 772 and False at FMTSICs 776, possibly indicating a finger-touch event at virtual button 622. Force-localization features 780 indicate the localization of force data among the FMTSICs 772, 776. An example of force-localization features is a sum of PMFE digital data of two or more of the PMFEs of each of the FMTSICs (force-sum data). Note that an average of PMFE digital data of two or more of the PMFEs of each of the FMTSICs is included in a force-sum data category because the average is a sum of PMFE digital data scaled by a constant (number of PMFEs). In the example shown, force-localization features 780 include: (1) a sum of PMFE digital data from PMFEs 782 and PMFEs 784, at FMTSIC 772, and (2) a sum of PMFE digital data from PMFEs 786 and PMFEs 788, at FMTSIC 776.

There are at least two different implementations of obtaining ultrasound-localization features. In a first implementation, the PMUT digital data 1032, 1036 of the respective FMTSICs can be transmitted to the host controller, and the host controller can derive the ultrasound-localization features (e.g., “PMUT Triggered” Boolean data of all of the FMTSICs) from the PMUT digital data of the respective FMTSICs. In a second implementation, the signal processing circuitry of each of the FMTSICs 772, 776 can calculate the “PMUT Triggered” Boolean data from the PMUT digital data of the respective FMTSIC 772, 776, the “PMUT Triggered” Boolean data of the respective FMTSICs 772, 776 can be transmitted to the host controller, and the host controller can derive the ultrasound-localization features from the “PMUT Triggered” Boolean data of the respective FMTSICs 772, 776.

There are at least two implementations of obtaining force-localization features. In a first implementation, the PMFE digital data 1034, 1038 of the respective FMTSICs can be transmitted to the host controller, and the host controller can derive the force-localization features (e.g., force-sum data of all of the FMTSICs) from the PMFE digital data of the respective FMTSICs. In a second implementation, the signal processing circuitry of each of the FMTSICs 772, 776 can calculate the force-sum data from the PMFE digital data 1034, 1038 of the respective FMTSIC 772, 776, the force-sum data of the respective FMTSICs 772, 776 can be transmitted to the host controller, and the host controller can derive the force-localization features from the force-sum data of the respective FMTSICs 772, 776.

Figure 32:
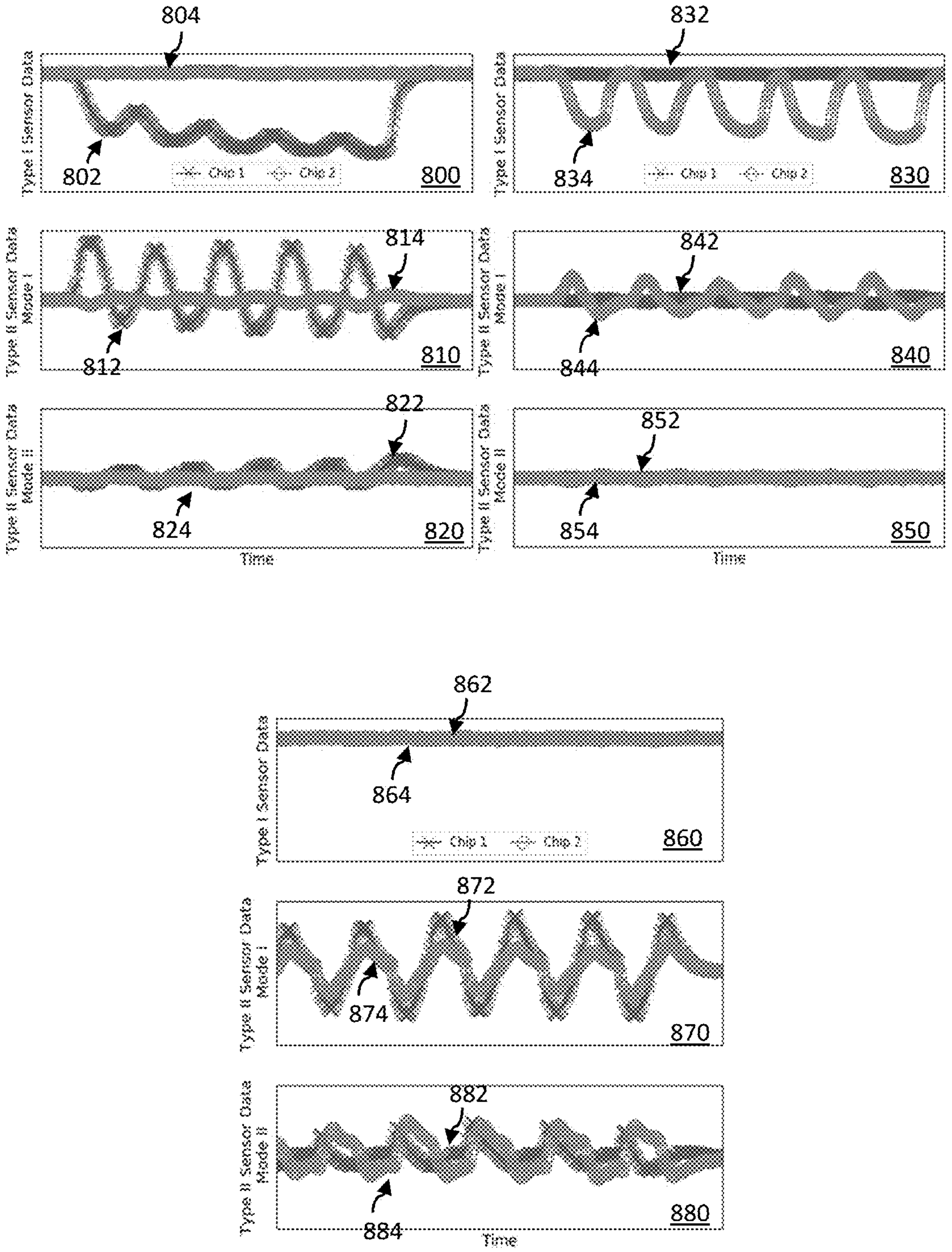
FIG. 32 is a diagram showing graphical plots of PMUT data, force-sum data (force-localization features), and force-difference data (force-resolution features) at two virtual buttons, shown in FIG. 31, in response to example events.
Figure 38:
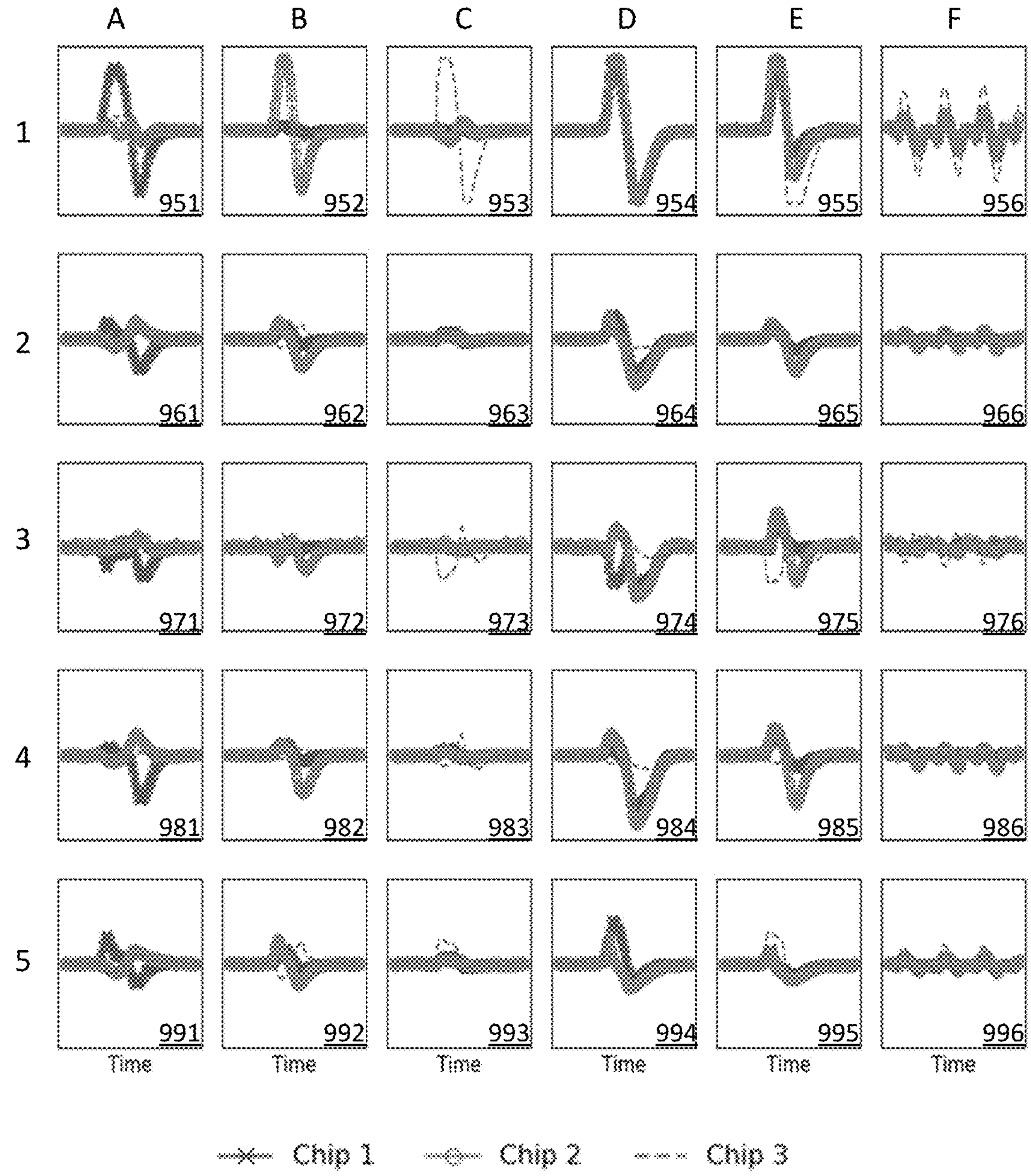
FIG. 38 is a diagram showing graphical plots of force-sum data (force-localization features) and force-difference data (force-resolution features) at three virtual buttons, shown in FIG. 33, in response to example events.
Figure 40:
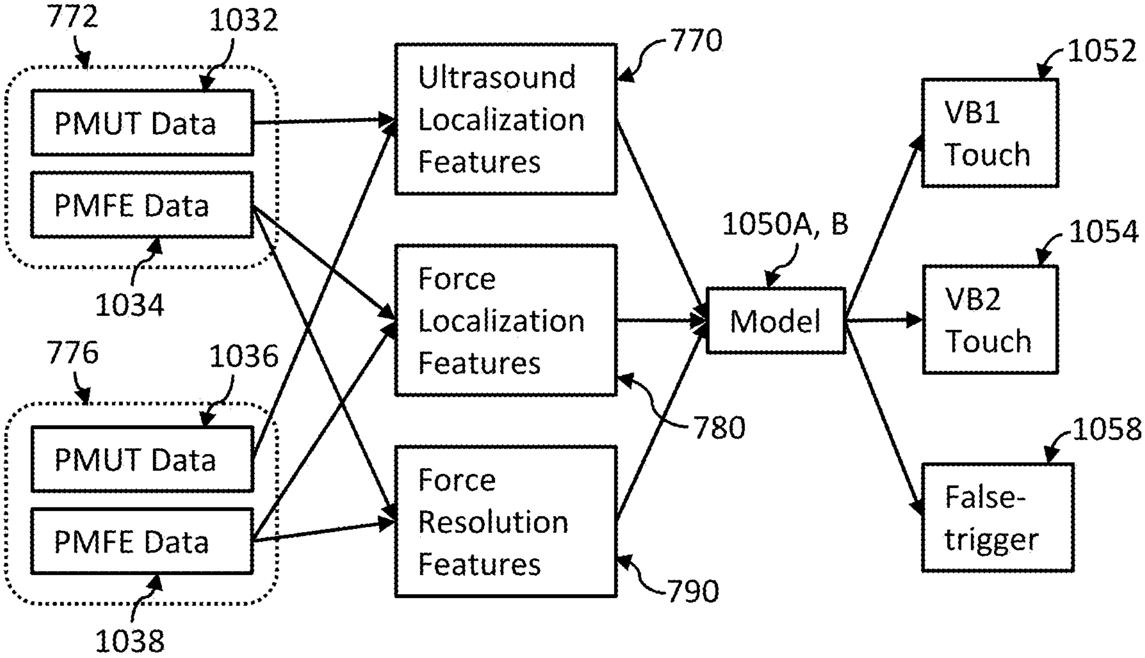
FIG. 40 is a schematic diagram showing the processing of PMUT digital data and PMFE digital data to determine touch input.

After obtaining the force-localization features and ultrasound-localization features (step 716), the host controller carries out steps 718 and 720. The host controller determines whether the event (from step 704) is a finger-touch event (Yes branch at step 718) or a false-trigger event (No branch at step 718), using at least in part a model. If the event is determined to be a finger-touch event (Yes branch at step 718), the host controller identifies which one of the virtual buttons was touched (is a touched virtual button), using at least in part the model (step 720). As shown in FIG. 40, the model 1050A has the force-localization features 780 and ultrasound-localization features 770 as inputs. In the event that there are two virtual buttons VB1, VB2, a possible outcome of making a determination using at least in part the model 1050A is that the event is a false-trigger event 1058, that the event is a finger-touch event at virtual button VB1 (1052), or that the event is a finger-touch event at virtual button VB2 (1054). The model can be human-made or constructed by machine learning trained using data such as shown in FIGS. 32 and 38.

Figure 39:
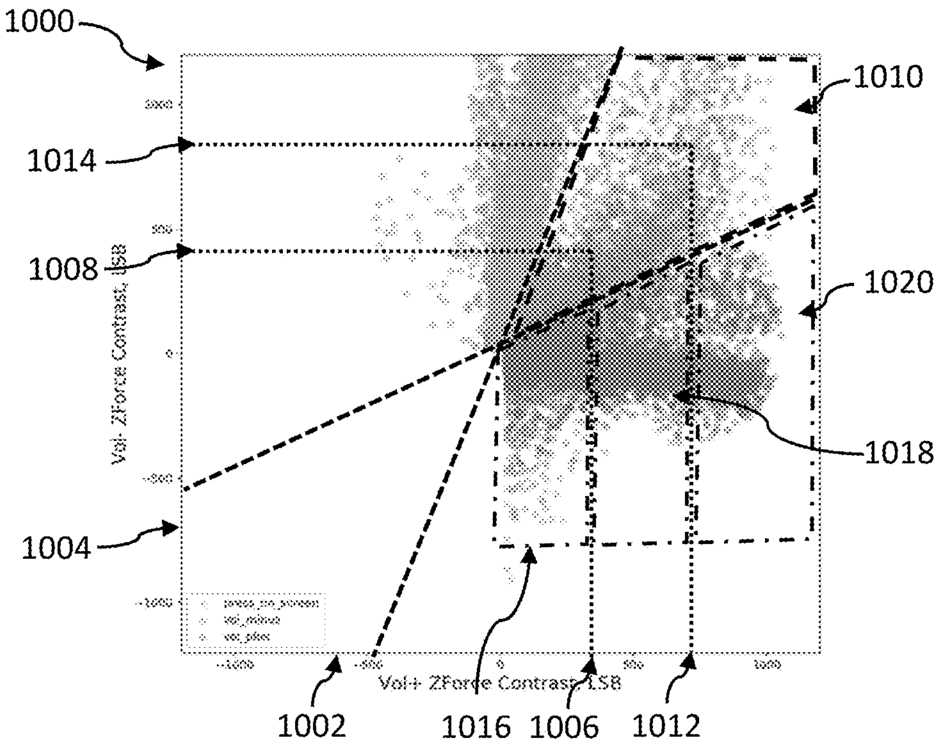
FIG. 39 is a diagram showing a graphical plot representing magnitude values of force-sum data at a first virtual button and a second virtual button, and certain examples of candidate conditions.

Consider an example of a model as implemented for a system (FIG. 31) having two virtual buttons 622, 624, with one FMTSIC (772, 776) corresponding to each of the virtual buttons 622, 624. Suppose that a model has ultrasound-localization features 770 ("PMUT Triggered" Boolean data) and force-localization features 780 (force-sum data) as inputs. FIG. 39 shows a graphical plot of example data points. For each data point, its x-axis value (along axis 1002) corresponds to the force-sum data at FMTSIC 772 and its y-axis value (along axis 1004) corresponds to the force-sum data at FMTSIC 776. FIG. 39 is a graphical representation of force-localization data of two FMTSICs (two virtual button) for example events.

In a first example, suppose that the ultrasound-localization features 780 indicate "PMUT Triggered" is True at first FMTSIC 772 and False at second FMTSICs 776, possibly indicating a finger-touch event at first FMTSIC 772 (first virtual button 622). However, a liquid droplet landing at first virtual button 622 may also cause PMUT 774 to trigger (the "PMUT Triggered" Boolean at first FMTSIC 772 to change to True), even though a force exerted by the liquid droplet on the PMFEs would be quite small. Accordingly, a force threshold $F_1$ for the force-sum data at FMTSIC 772 is set, indicated by line 1006. An analogous force threshold $F_1$ is set for force-sum data at FMTSIC 776, indicated by line 1008. In this example, the host controller determines the event to be a false-trigger event when the force-sum data at FMTSIC 772 indicates an applied force less than the force threshold $F_1$. For example, events corresponding to data points in region 1016 are determined to be false-trigger events. In this example, the host controller determines the event might be a finger-touch event when the force-sum data at FMTSIC 772 indicates an applied force greater than the force threshold $F_1$. For example, events corresponding to data points in regions 1018, 1020 are determined to be to be finger-touch events at first FMTSIC 772 (first virtual button 622). For example, the value of force threshold $F_1$ can be in a range of 150 grams-force to 250 grams-force, or approximately 200 grams-force.

Moreover, it is preferable to identify a simultaneous touch at both virtual buttons as a false-trigger event. Region 1010 represents events for which the force-sum data of the FMTSICs 772, 776 are not sufficiently different. A simultaneous touch at both virtual buttons would fall into region 1010. In this example, the host controller determines the event to be a false-trigger event when the event corresponds to a data point in region 1010. Region 1010 includes portions in which the force-sum data of first FMTSIC 772 indicates an applied force greater than $F_1$ (to the right of threshold line 1006) or the force-sum data of second FMTSIC 776 indicates an applied force greater than $F_1$ (above the threshold line 1008).

In a second example, suppose that the ultrasound-localization features 780 indicate "PMUT Triggered" is False at FMTSICs 772 and 776. In addition to the possibility that there is no touch at both virtual buttons 622, 624, there is also a possibility that there is touch by a porous-glove covered finger at (1) one of the virtual buttons 622, 624, or (2) both virtual buttons 622, 624. It is preferable to identify a simultaneous touch at both virtual buttons as a false-trigger event, as discussed for the first example. In this example, since all of the "PMUT Triggered" are False, a force threshold $F_2$ for the force-sum data at FMTSIC 772 is set, indicated by line 1012. An analogous force threshold $F_2$ is set for force-sum data at FMTSIC 776, indicated by line 1014. The force threshold $F_2$ is greater than the force threshold $F_1$. For example, the value of force threshold $F_2$ can be in a range of 450 grams-force to 550 grams-force, or approximately 500 grams-force.

FIG. 39 illustrates a concept of determining that an FMTSIC is a candidate FMTSIC, which is an FMTSIC that has possibly been touched in a finger-touch event. The conditions for a candidate FMTSIC are stricter for an FMTSIC for which "PMUT Triggered" is False. An FMTSIC for which "PMUT Triggered" is True must have force-sum data indicating an applied force greater than a lower force threshold $F_1$ (1006 or 1008) while an FMTSIC for which "PMUT Triggered" is False must have force-sum data indicating an applied force greater than a higher force threshold $F_2$ (1012 or 1014). Using a model 1050A, the host controller can additionally determine whether the candidate FMTSIC has been touched in a finger-touch event. This additional determining includes the host controller comparing the force-sum data (force-localization data) of the candidate FMTSIC and any other FMTSICs. In the example shown, a pair of force-sum data of a candidate FMTSIC (e.g., along x-axis 1002) and another FMTSIC (e.g., along y-axis 1004) falling within region 1010 are "rejected" meaning that it is determined that the event is a false-trigger event.

Figure 27:
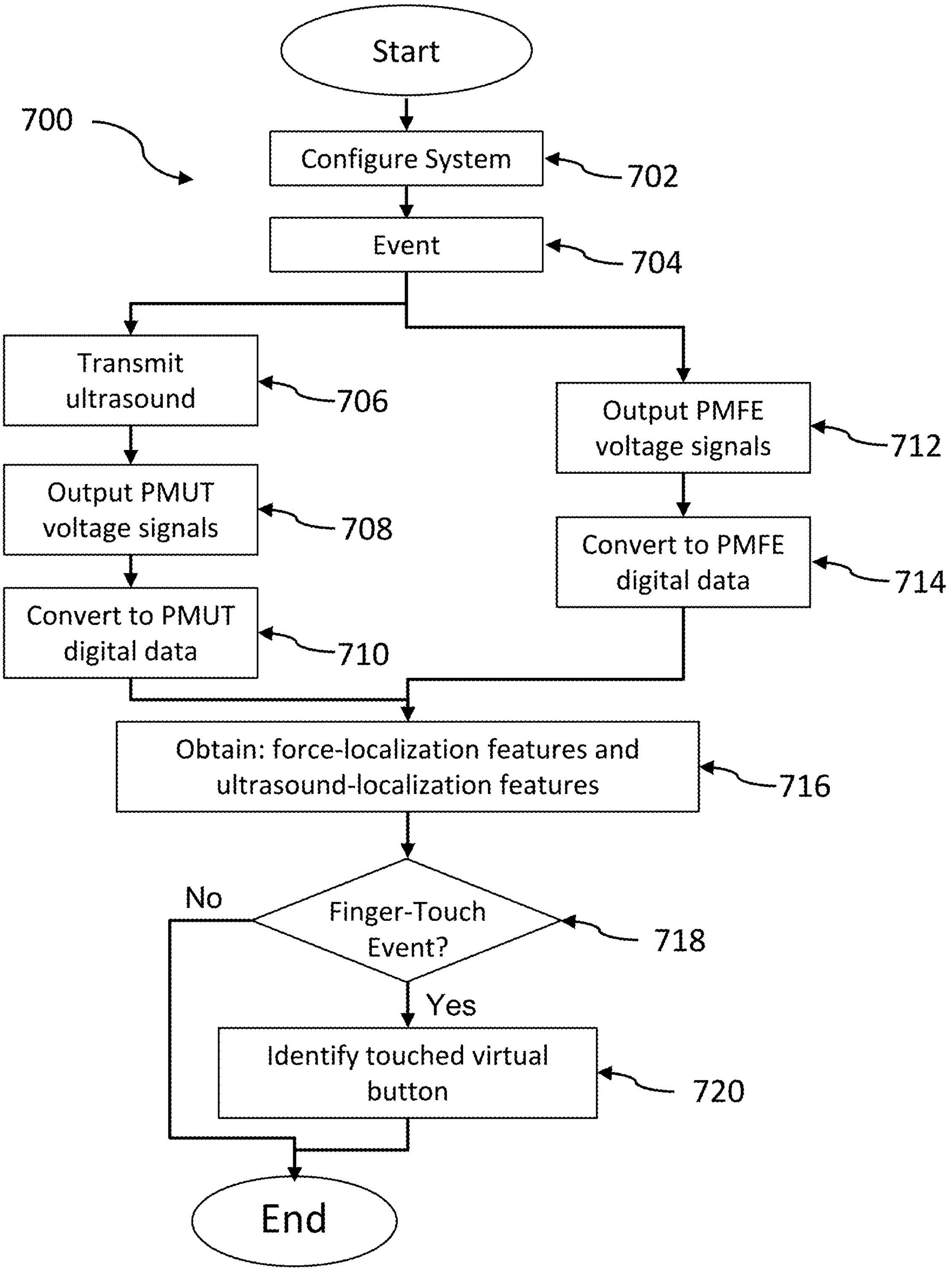
FIGS. 27 and 28 are flow diagrams of methods of detecting a finger-touch event at a one of a plurality of virtual buttons, using force-localization features and ultrasound-localization features.

Method 730 (FIG. 28) of detecting a finger-touch event at one of a plurality of virtual buttons illustrates the use the concepts from FIG. 39. Method 730 includes steps 702, 704, 706, 708, 710, 712, 714, 716, 732, 734, and 736. Steps 702, 704, 706, 708, 710, 712, 714, and 716 have been described with reference to method 700 (FIG. 27). After obtaining the force-localization features and ultrasound-localization features (step 716), the host controller carries out steps 732, 734, and 736. The force-localization features include a sum of PMFE digital data of two or more of the PMFEs of each of the FMTSICs (force-sum data). The ultrasound-localization features include "PMUT Triggered" Boolean data of each of the FMTSICs. At step 732, the host controller determines FMTSICs that satisfy first candidate conditions or second candidate conditions to identify candidate FMTSICs. If there are no candidate FMTSICs (No branch at step 732), then the host controller determines that the event is a false-trigger event. Step 732 is shown in greater detail in FIG. 29. For each FMTSIC: (1) the FMTSIC satisfies first candidate conditions (step 750) if the "PMUT Triggered" is True (Yes branch at step 742) and the force-sum data of the FMTSIC indicates an applied force greater than $F_1$ (Yes branch at step 746); (2) the FMTSIC satisfies second candidate conditions (step 748) if the "PMUT Triggered" is False (No branch at step 742) and the force-sum data of the FMTSIC indicates an applied force greater than $F_2$ (Yes branch at step 744), where $F_2$ is greater than $F_1$; (3) the FMTSIC does not satisfy the candidate conditions (step 756) if the "PMUT Triggered" is True (Yes branch at step 742) and the force-sum data of the FMTSIC indicates an applied force not greater than $F_1$ (No branch at step 746); and (4) the FMTSIC does not satisfy the candidate conditions (step 754) if the "PMUT Triggered" is False (No branch at step 742) and the force-sum data of the FMTSIC indicates an applied force not greater than $F_2$ (No branch at step 744).

If there is at least one candidate FMTSIC (Yes branch at step 732), step 734 is carried out. The host controller determines whether the event (from step 704) is a finger-touch event (Yes branch at step 734) or a false-trigger event (No branch at step 734), using at least in part a model. The model has the force-localization features and the ultrasound-localization features as inputs. This determining includes the host controller comparing the force-sum data of the candidate FMTSIC and any other FMTSICs. For example, a pair of a candidate FMTSIC and another FMTSIC falling within region 1010 can be "rejected" as a false-trigger at step 734. If the event is determined to be a finger-touch event (Yes branch at step 734), the host controller identifies which one of the virtual buttons was touched (is a touched virtual button), using at least in part the model (step 736).

FIG. 30 shows a method 760 of detecting a finger-touch event at one of a plurality of virtual buttons. Method 760 includes steps 702, 704, 706, 708, 710, 712, 714, 762, 764, and 766. Steps 702, 704, 706, 708, 710, 712, and 714 have been described with reference to method 700 (FIG. 27). At step 762, the host controller obtains force-localization features, force-resolution features, and ultrasound-localization features of the FMTSICs. As shown in FIG. 40, force-resolution features 790 are derived from the PMFE digital data 1034, 1038 of the respective FMTSICs 772, 776. Force-resolution features 1036 are not needed for method 700 (FIG. 27) but are needed for method 760 (FIG. 30). Implementations of force-resolution features at two virtual buttons are shown in FIG. 31. Force-resolution features 790 indicate the force (strain) resolution in certain direction at each FMTSIC 772, 776. An example of force-resolution features is a difference among PMFE digital data of two or more of the PMFEs of each of the FMTSICs (force-difference data). In the example shown, force-resolution features 790 include: (1) a difference between PMFE digital data from PMFEs 782 and PMFEs 784, at FMTSIC 772, and (2) a difference between PMFE digital data from PMFEs 786 and PMFEs 788, at FMTSIC 776.

There are at least two implementations of obtaining force-resolution features. In a first implementation, the PMFE digital data 1034, 1038 of the respective FMTSICs can be transmitted to the host controller, and the host controller can derive the force-resolution features (e.g., force-difference data of all of the FMTSICs) from the PMFE digital data of the respective FMTSICs. In a second implementation, the signal processing circuitry of each of the FMTSICs 772, 776 can calculate the force-difference data from the PMFE digital data 1034, 1038 of the respective FMTSIC 772, 776, the force-difference data of the respective FMTSICs 772, 776 can be transmitted to the host controller, and the host controller can derive the force-resolution features from the force-difference data of the respective FMTSICs 772, 776.

After obtaining the force-localization features, force-resolution features, and ultrasound-localization features (step 762), the host controller carries out steps 764 and 766. The host controller determines whether the event (from step 704) is a finger-touch event (Yes branch at step 764) or a false-trigger event (No branch at step 764), using at least in part a model. If the event is determined to be a finger-touch event (Yes branch at step 764), the host controller identifies which one of the virtual buttons was touched (is a touched virtual button), using at least in part the model (step 766). As shown in FIG. 40, the model 1050B has the force-localization features 780, force-resolution features 790, and ultrasound-localization features 770 as inputs. In the event that there are two virtual buttons VB1, VB2, a possible outcome of making a determination using at least in part the model 1050B is that the event is a false-trigger event 1058, that the event is a finger-touch event at virtual button VB1 (1052), or that the event is a finger-touch event at virtual button VB2 (1054). The model can be human-made or constructed by machine learning trained using data such as shown in FIGS. 32 and 38.

Figure 34:
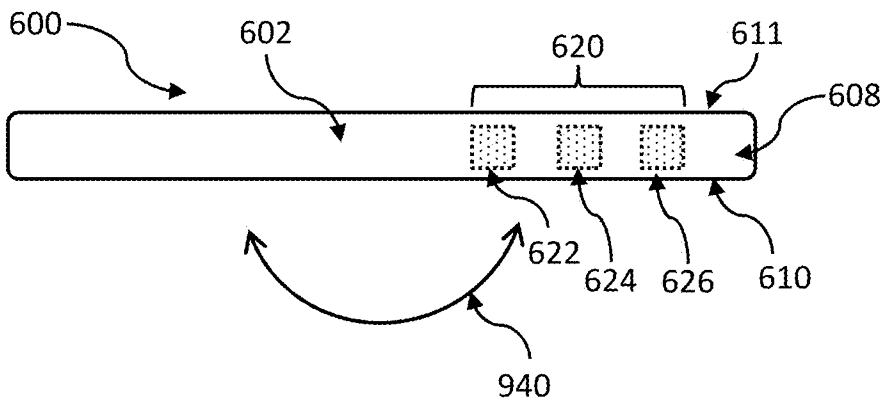
FIG. 34 is a schematic view of a housing of a smartphone undergoing bending.
Figure 35:
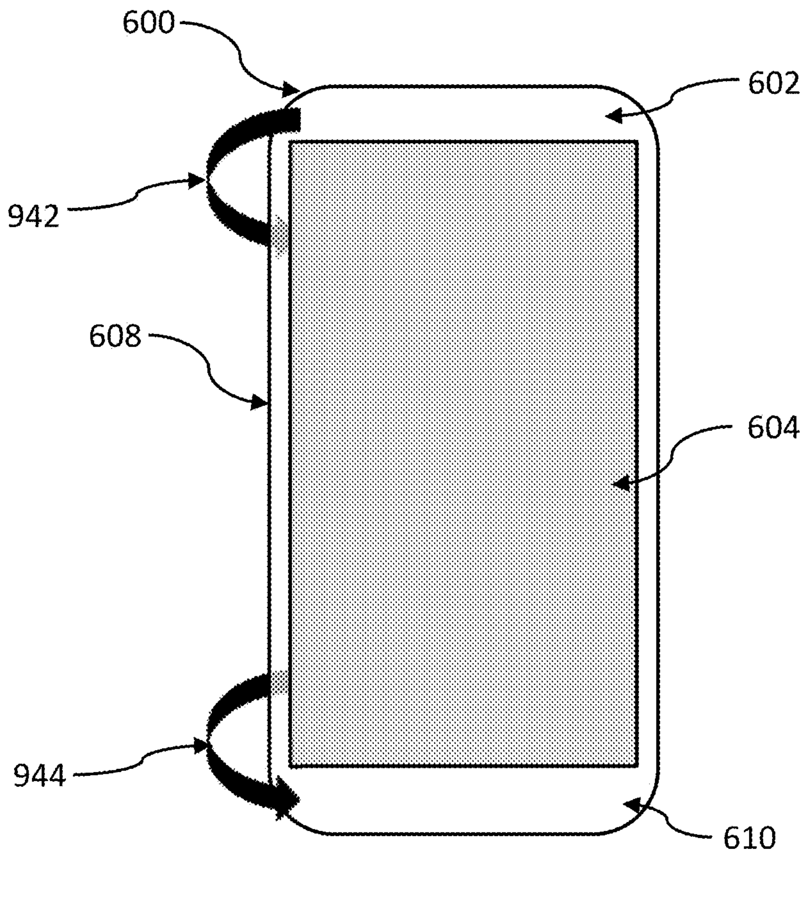
FIG. 35 is a schematic view of a housing of a smartphone undergoing twisting.
Figure 36:
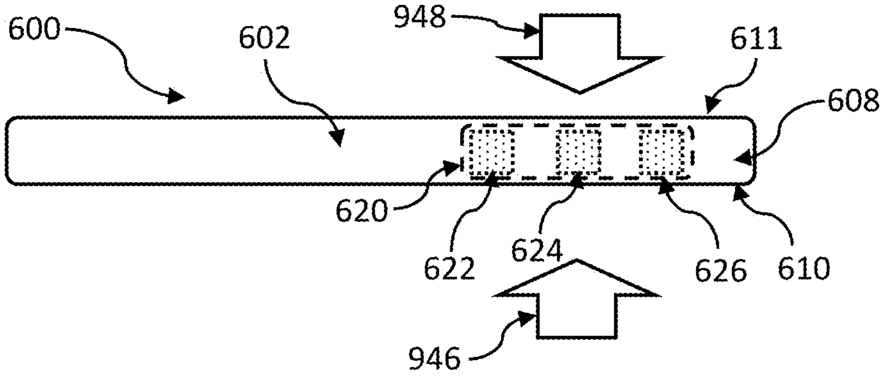
FIG. 36 is a schematic view of a housing of a smartphone undergoing pinching.

In the foregoing (methods 700, 730), we have considered liquid droplet(s) on one or more of the virtual buttons and simultaneous touch at more than one of the virtual button as examples of false-trigger events. There are some other false-trigger events that can occur. FIGS. 34 and 36 show a side face 608 of a housing 602 of a smartphone 600, including virtual buttons 620. A front face 610 and a back face 611 of the housing 602 border the side face 608 at the respective edges. FIG. 34 shows the housing 602 undergoing bending as a result of applied forces (forces applied to the front face 610 and the back face 611) represented by arrows 940. FIG. 35 shows a front face 610 and a flat panel display 604 of a housing 602 of a smartphone 600. A side face 608 border the front face 610 at its left edge. FIG. 35 shows the housing 602 undergoing twisting as a result of applied forces (forces applied to the front face 610 and the back face 611) represented by arrows 942 and 944. FIG. 36 shows the housing 602 undergoing pinching as a result of applied forces (forces applied to the front face 610 and the back face 611, close to the virtual buttons 620) represented by arrows 946, 948. There may also be tapping (or typing) anywhere on the housing 602 excluding the virtual button, such as the front face 610, flat panel display 604, and back face 611. False-trigger events include: liquid droplet(s) on one or more of the virtual buttons, simultaneous touch at more than one of the virtual buttons, bending of the housing, twisting of the housing, typing or tapping on the housing, and pinching of the housing. One reason for using force-resolution features to determine finger-touch and false-trigger events is to improve determination of false-trigger events.

Figure 37:
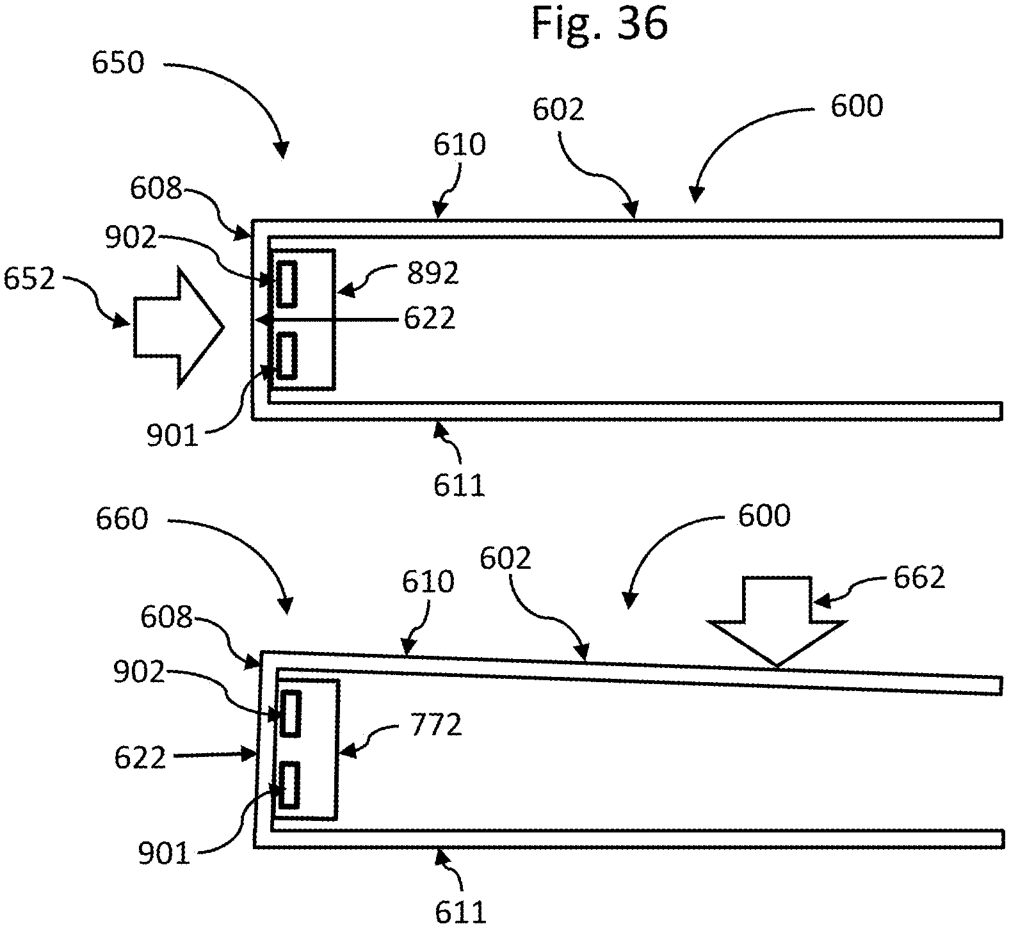
FIG. 37 is a diagram showing schematic cross-sectional views of forces being applied to a housing of a smartphone.

FIG. 37 shows schematic cross-sectional views 650, 660 of forces being applied to housing 602 of smartphone 600. The cross-sectional views show a front face 610, a back face 611, and a side face 608 extending between the front face 610 and the back face 611. Also shown is a cross section is an FMTSIC 892 adhered to an interior surface of the side face 608, corresponding to virtual button 622. FMTSIC includes PMFEs 901 and 902 at their respective positions. Cross-sectional view 650 shows a force 652 being applied by a finger at virtual button 622. This results in a strain at both PMFEs 901 and 902, and a difference between the strains at PMFEs 901, 902 is quite small. Accordingly, force-difference data calculated as a difference between PMFE data at PMFEs 901 and 902 would be quite small. When a finger is pressing against virtual button 622, both PMFEs 901, 902 are within the finger-touch zone.

Cross-sectional view 660 shows a force 662 being applied by a finger at a location on the front face 610, away from the virtual button 622. This also results in a strain at both PMFEs 901 and 902. As the housing 602 undergoes a deformation as a result of the applied force 662, PMFEs 902 may exhibit more strain (greater PMFE digital data) than PMFEs 901. Accordingly, force-difference data calculated as a difference between PMFE data at PMFEs 901 and 902 would not be as small as in the case shown for cross-sectional view 650.

FIG. 31 shows an implementation of ultrasound-localization features 770, force-localization features 780, and force-resolution features 790 at two virtual buttons 622, 624, corresponding to FMTSICs 772, 776. FIG. 32 shows graphical plots of PMUT data (from which ultrasound-localization features can be derived), force-sum data (force-localization features), and force-difference data (force-resolution features), in response to certain events. Graphical plots 800, 810, and 820 were recorded in response to a first finger-touch event, in which a finger was held against first virtual button 622 (corresponding to first FMTSIC 772) and repeatedly pressed (pressed five times, without completely releasing the finger until the last press was completed). Graphical plots 830, 840, and 850 were recorded in response to a second finger-touch event, in which a finger was pressed against second virtual button 624 (corresponding to second FMTSIC 776) and released (pressed and released five times). Graphical plots 860, 870, and 880 were recorded in response to a false-trigger event, in which the housing was repeatedly pinched near the virtual buttons (situation shown in FIG. 36).

Consider the first finger-touch event, at first virtual button 622. Graphical plot 800 shows PMUT digital data 802 for first FMTSIC 772 and PMUT digital data 804 for second FMTSIC 776. These PMUT digital data 802, 804 show that "PMUT Triggered" is True (at multiple times) at first FMTSIC 772 and False at second FMTSIC 776. Graphical plot 810 shows PMFE force-sum data 812 for first FMTSIC 772 and PMFE force-sum data 804 for second FMTSIC 776. These force-localization features 812, 814 show that there is strong force-localization at first FMTSIC 772. Graphical plot 820 shows PMFE force-difference data 822 for first FMTSIC 772 and PMFE force-difference data 824 for second FMTSIC 776. These force-resolution features 822, 824 show that force differences at first FMTSIC 772 are not quite small and force differences at second FMTSIC 776 are quite small.

Consider the second finger-touch event, at second virtual button 624. Graphical plot 830 shows PMUT digital data 832 for first FMTSIC 772 and PMUT digital data 834 for second FMTSIC 776. These PMUT data 832, 834 show that "PMUT Triggered" is True (at multiple times) at FMTSIC 776 and False at FMTSIC 772. Graphical plot 840 shows PMFE force-sum data 842 for first FMTSIC 772 and PMFE force-sum data 844 for second FMTSIC 776. These force-localization features 842, 844 show that the force-localization is strong at second FMTSIC 776. Graphical plot 850 shows PMFE force-difference data 852 for first FMTSIC 772 and PMFE force-difference data 854 for second FMTSIC 776. These force-resolution features 852, 854 show that force differences at first FMTSIC 772 and at second FMTSIC 776 are quite small.

Consider the false-trigger event, in which the housing is repeatedly pinched. Graphical plot 860 shows PMUT digital data 862 for first FMTSIC 772 and PMUT digital data 864 for second FMTSIC 776. The PMUT digital data 862, 864 show that "PMUT Triggered" is False at the first FMTSIC 772 nor the second FMTSIC 776. Graphical plot 870 shows PMFE force-sum data 872 for first FMTSIC 772 and PMFE force-sum data 874 for second FMTSIC 776. These force-localization features 872, 874 show that the force-localization is strong at both first FMTSIC 772 and at second FMTSIC 776. Graphical plot 880 shows PMFE force-difference data 882 for first FMTSIC 772 and PMFE force-difference data 884 for second FMTSIC 776. These force-resolution features 882, 884 show that force differences are not small at first FMTSIC 772 and at second FMTSIC 776. Since there is deformation of the housing, strain is more widely present in the housing. There is significant strain at both FMTSICS 772 and 776, which in this example results in significant force-localization features and force-resolution features at both FMTSICs 772 and 776. When taken in combination, the graphical plots (FIG. 32) of the ultrasound-localization features (860), force-localization features (870), and force-resolution features (880) of the pinching false-trigger event are different and distinguishable from the ultrasound-localization features (800, 830), force-localization features (810, 840), and force-resolution features (820, 850) of the finger-touch events at the respective virtual buttons.

Figure 33:
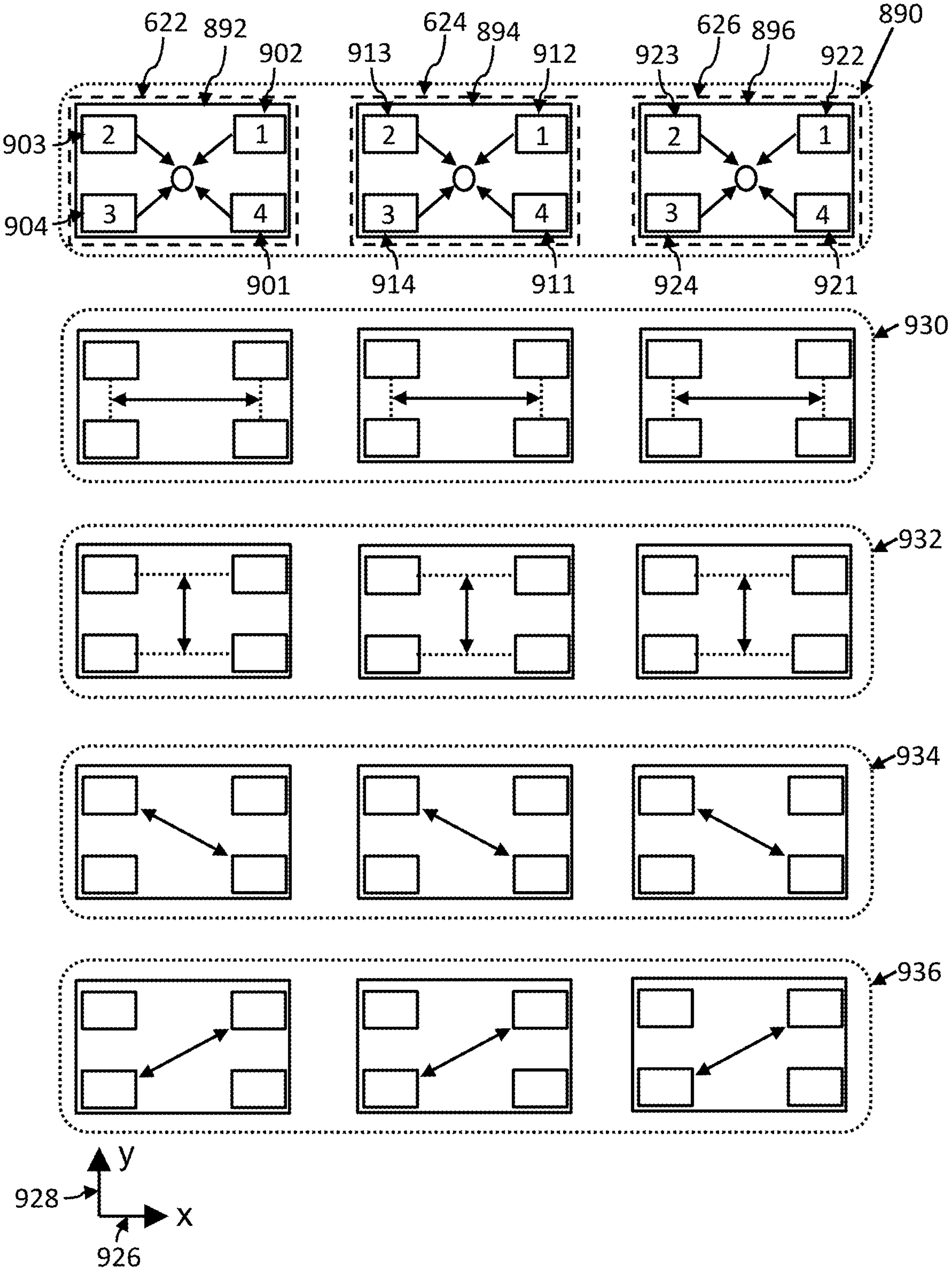
FIG. 33 is a schematic diagram of implementations of force-localization features and force-resolution features at three virtual buttons.

Implementations of force-localization features and force-resolution features, at three virtual buttons are shown in FIG. 33. For case of illustration, ultrasound-localization features are not shown. FIG. 33 is a schematic diagram of implementations of force-localization features 890 and force-resolution features (930, 932, 934, 936) at three virtual buttons (622, 624, 626), corresponding to three FMTSICs (892, 894, 896). There is one FMTSIC 892, 894, and 896 corresponding to each of the virtual buttons 622, 624, and 626, respectively. Each FMTSIC 892, 894, and 896 includes: PMFEs 902, 912, and 922 in its first quadrant (Q1) (upper right), PMFEs 903, 913, and 923 in its second quadrant (Q2) (upper left), and PMFEs 904, 914, and 924 in its third quadrant (Q3) (lower left), and PMFEs 901, 911, and 921 in its fourth quadrant (Q4) (lower right). Force-localization features 890 include a sum of PMFE digital data of the PMFEs of the four quadrants of each of the FMTSICs, namely: PMFE(Q1)+PMFE(Q2)+PMFE(Q3)+PMFE(Q4). Force-resolution features 930 include a force-difference data that provide information about the force resolution in the x-axis direction 926 of each of the FMTSICs: [PMFE(Q1)+PMFE(Q4)]−[PMFE(Q2)+PMFE(Q3)]. Force-resolution features 932 include a force-difference data that provide information about the force resolution in the y-axis direction 928 of each of the FMTSICs: [PMFE(Q1)+PMFE(Q2)]−[PMFE(Q3)+PMFE(Q4)]. Force-resolution features 934 and 936 include a force-difference data that provide information about the force resolution in a diagonal direction or anti-diagonal direction of each of the FMTSICs. Force-resolution features 934 include the following force-difference data: PMFE(Q2)−PMFE(Q4). Force-resolution features 936 include the following force-difference data: PMFE(Q1)−PMFE(Q3).

FIG. 38 shows graphical plots of some force-localization features and force-resolution features (FIG. 33), in response to certain events. The graphical plots are arranged in a two-dimension array according to the following plan: columns A (951, 961, 971, 981, 991), B (952, 962, 972, 982, 992), and C (953, 963, 973, 983, 993) correspond to finger-touch events at virtual buttons 622, 624, and 626, respectively; column D (954, 964, 974, 984, 994) corresponds to a false-trigger event in which the smartphone housing is undergoing bending (FIG. 34); column E (955, 965, 975, 985, 995) corresponds to a false-trigger event in which the smartphone housing is undergoing twisting (FIG. 35); column F (956, 966, 976, 986, 996) corresponds to a false-trigger event in which there is tapping or typing on the smartphone housing; row 1 (951, 952, 953, 954, 955, 956) corresponds to force-localization features 890; and rows 2 (961, 962, 963, 964, 965, 966), 3 (971, 972, 973, 974, 975, 976), 4 (981, 982, 983, 984, 985, 986), and 5 (991, 992, 993, 994, 995, 996) correspond to force-resolution features 930, 932, 934, and 936, respectively. Each of the graphical plots include the respective PMFE data of first FMTSIC 892 (shown as x's), second FMTSIC 894 (shown as circles), and third FMTSIC 896 (shown as dotted line). When taken in combination, the graphical plots (FIG. 38) of force-localization features 890 and force-resolution features 930, 932, 934, and 936 are different and distinguishable for the finger-touch events at the respective virtual buttons (A, B, C) and the false-trigger events (D: bending, E: twisting, F: tapping or typing).

Accordingly, false-trigger events that can be determined using method 760 include: liquid droplet(s) on one or more of the virtual buttons, simultaneous touch at more than one of the virtual buttons, bending of a housing mechanically coupled to the cover layer, twisting of the housing, typing or tapping on the housing, and pinching of the housing.

Figure 28:
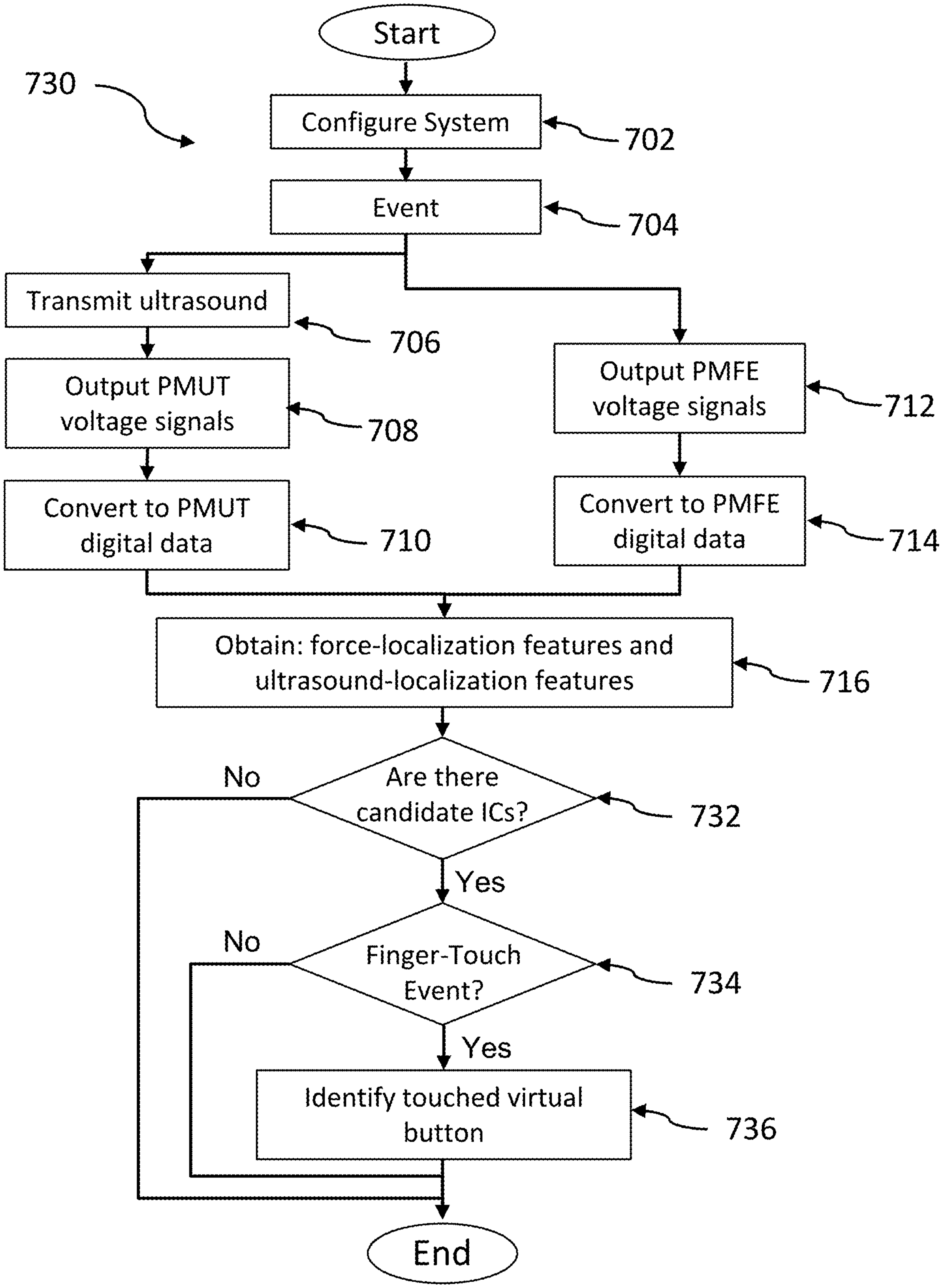
Figure 29:
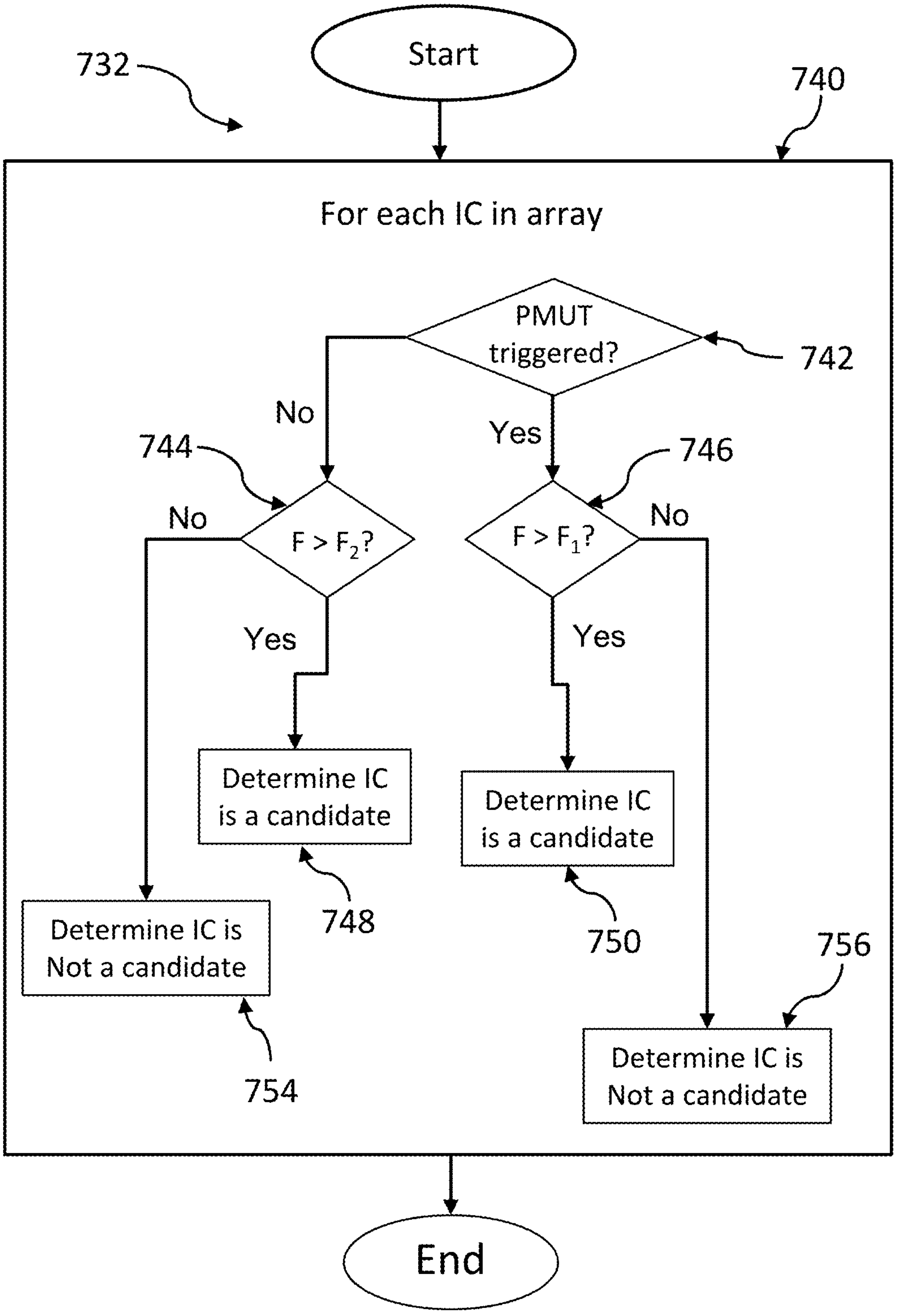
FIG. 29 is a flow diagrams of one of the steps in the method of FIG. 28, relating to identifying candidate FMTSICs.

Row 1 corresponds to force-localization features 890. Graphical plots 954, 955 show the force-sum data under bending and twisting of the smartphone housing, respectively. In each of these graphical plots, force-sum data at first FMTSIC 892 (shown as x's), second FMTSIC 894 (shown as circles), and third FMTSIC 896 (shown as dotted line) are shown. In each of the graphical plots 954, 955, the force-sum data are similar (the waveforms are close to each other). These force-sum data at the FMTSICs are similar because bending and twisting create simultaneous force-localization data at the FMTSICs. Bending and twisting false-trigger events in which the force-sum data of the FMTSICs are sufficiently similar would fall into the "false-trigger" region 1010 of FIG. 39. In order to screen bending and twisting false-trigger events with a high confidence level, it is necessary to distinguish force-sum data in "false-trigger" region 1010 from other regions ("finger-touch" regions) 1018, 1020. We have found that force-sum data in "false-trigger" region 1010 can be more readily distinguished from force-sum data in higher-force ($F>F_2$) region 1020 than from force-sum data in medium-force ($F_1<F\leq F_2$) region 1018. Accordingly, it is possible to determine false-trigger events arising from bending or twisting of the housing using method 730 (FIG. 28). False-trigger events that can be determined using method 730 include: liquid droplet(s) on one or more of the virtual buttons, simultaneous touch at more than one of the virtual buttons, bending of a housing mechanically coupled to the cover layer, and twisting of the housing.

False-trigger events that can be determined using method 700 (FIG. 27) include: liquid droplet(s) on one or more of the virtual buttons and simultaneous touch at more than one of the virtual buttons. If the model 1050A (FIG. 40), which has the force-localization features and the ultrasound-localization features as inputs, is configured to distinguish between force-sum data in higher-force ($F>F_2$) region 1020 (FIG. 39) and force-sum data in medium-force ($F_1<F\leq F_2$) region 1018, false-trigger events that can be determined using method 700 can additionally include bending of a housing mechanically coupled to the cover layer and twisting of the housing.

What is claimed is:

1. A method comprising:

configuring an electronic apparatus comprising (a) a housing, (b) piezoelectric capacitors, and (c) a host controller, the housing comprising a front face, a back face, and a side face extending between the front face and the back face, the side face having an outer surface which can be touched by a finger and an inner surface opposite the outer surface, the piezoelectric capacitors being mechanically coupled to the housing at the inner surface;

configuring at least some of the piezoelectric capacitors into groups of piezoelectric force-measuring elements, each group corresponding to one of a plurality of virtual buttons;

configuring the host controller, in communication with the piezoelectric force-measuring elements;

obtaining, by the host controller, force-localization features and force-resolution features of each of the groups of piezoelectric force-measuring elements; and determining, by the host controller, whether an event is a false-trigger event, using at least in part a model that has the force-localization features and the force-resolution features as inputs, wherein the false-trigger event comprises a deformation of the housing, wherein the force-localization features comprise a sum of data obtained from two or more of the piezoelectric force-measuring elements of each of the groups of piezoelectric force-measuring elements;

wherein the force-resolution features comprise a difference among data obtained from two or more of the piezoelectric force-measuring elements of each of the groups of piezoelectric force-measuring elements, and wherein the deformation comprises (A) a tapping at the housing, (B) a pinching of the housing between the front face and the back face, and/or (C) a bending or twisting of the housing.

2. The method of claim 1, wherein:

the side face is elongate along a longitudinal direction perpendicular to a transverse direction, the transverse direction extending between the front face and the back face; and the groups of piezoelectric force-measuring elements are arrayed along the longitudinal direction.

3. The method of claim 2, wherein:

for each of the groups, at least two of the piezoelectric force-measuring elements are arrayed along the longitudinal direction.

4. The method of claim 2, wherein:

for each of the groups, at least two of the piezoelectric force-measuring elements are arrayed along the transverse direction.

5. The method of claim 2, wherein:

for each of the groups, at least two of the piezoelectric force-measuring elements are arrayed along a diagonal direction between the longitudinal direction and the transverse direction.

6. The method of claim 2, wherein:

each of the groups of comprises four piezoelectric force-measuring elements; and for each of the groups, the four piezoelectric force-measuring elements are positioned in respective quadrants.

7. The method of claim 2, wherein:

the deformation comprises the twisting of the housing, and the twisting of the housing is about the longitudinal direction.

8. The method of claim 2, wherein:

the deformation comprises the bending of the housing, and the bending of the housing along the longitudinal direction.

9. The method of claim 1, wherein:

the electronic apparatus is a smartphone; and the front face includes a flat panel display.

10. The method of claim 9, wherein:

the deformation comprises the tapping at the housing, and the tapping at the housing comprises typing at the flat panel display.

11. The method of claim 1, wherein:

the piezoelectric capacitors are mechanically coupled to the housing via an adhesive, the adhesive comprising double-sided tape, pressure sensitive adhesive (PSA), epoxy adhesive, or acrylic adhesive.

12. The method of claim 1, wherein the piezoelectric comprise one or more of aluminum nitride, scandium-doped aluminum nitride, polyvinylidene fluoride (PVDF), lead zirconate titanate (PZT), $K_xNa_{1-x}NbO_3$ (KNN), quartz, zinc oxide, and lithium niobate.

13. The method of claim 1 further comprising:

determining, by the host controller, whether the event is a finger-touch event or a finger-press event at one or more of the virtual buttons, using at least in part the model that has the force-localization features and the force-resolution features as the inputs.

14. A method comprising:

configuring an electronic apparatus comprising (a) a housing, (b) piezoelectric capacitors, and (c) a host controller, the housing comprising a front face, a back face, and a side face extending between the front face and the back face, the side face having an outer surface which can be touched by a finger and an inner surface opposite the outer surface, the piezoelectric capacitors being mechanically coupled to the housing at the inner surface;

configuring at least some of the piezoelectric capacitors into groups of piezoelectric force-measuring elements, each group corresponding to one of a plurality of virtual buttons;

configuring the host controller, in communication with the piezoelectric force-measuring elements;

obtaining, by the host controller, force-localization features and force-resolution features of each of the groups of piezoelectric force-measuring elements; and determining, by the host controller, whether an event is a false-trigger event, using at least in part a model that has the force-localization features and the force-resolution features as inputs, wherein the false-trigger event comprises a deformation of the housing, wherein the piezoelectric force-measuring elements are piezoelectric micromechanical force-measuring elements (PMFEs), and wherein one or more integrated circuits (ICs) comprise the PMFEs.

15. A method comprising:

configuring an electronic apparatus comprising (a) a housing, (b) piezoelectric capacitors, and (c) a host controller, the housing comprising a front face, a back face, and a side face extending between the front face and the back face, the side face having an outer surface which can be touched by a finger and an inner surface opposite the outer surface, the piezoelectric capacitors being mechanically coupled to the housing at the inner surface;

configuring at least some of the piezoelectric capacitors into first groups of piezoelectric force-measuring elements, each first group corresponding to one of a plurality of virtual buttons;

configuring the host controller, in communication with the piezoelectric force-measuring elements;

obtaining, by the host controller, force-localization features and force-resolution features of each of the first groups of piezoelectric force-measuring elements;

determining, by the host controller, whether an event is a false-trigger event, using at least in part a model that has the force-localization features and the force-resolution features as inputs, wherein the false-trigger event comprises a deformation of the housing, configuring at least some of the piezoelectric capacitors into second groups of piezoelectric ultrasonic transducers, each second group corresponding to one of a plurality of the virtual buttons;

configuring the host controller, in communication with the piezoelectric ultrasonic transducers;

obtaining, by the host controller, ultrasound-localization features of each of the second groups of piezoelectric ultrasonic transducers, the ultrasound-localization features comprising piezoelectric-ultrasonic-transducer-triggered Boolean data of each of the second groups of piezoelectric ultrasonic transducers; and determining, by the host controller, whether the event is a finger-touch event or a finger-press event at one or more of the virtual buttons, using at least in part the model, the model having the ultrasound-localization features, the force-localization features, and the force-resolution features as inputs.

* * * * *